(12) United States Patent
Zarafyants et al.

(10) Patent No.: US 8,321,854 B1
(45) Date of Patent: Nov. 27, 2012

(54) CLIENT WITH FLEXIBLE GRAMMAR-BASE SYNTAX

(75) Inventors: Artem Zarafyants, St. Petersburg (RU); Sergey Alexeev, St. Petersburg (RU)

(73) Assignee: EMC Corporations, Hopkinton, MA (US)

(*) Notice: Subject to any disclaimer, the term of this patent is extended or adjusted under 35 U.S.C. 154(b) by 1124 days.

(21) Appl. No.: 12/002,584

(22) Filed: Dec. 18, 2007

(51) Int. Cl.
*G06F 9/44* (2006.01)
(52) U.S. Cl. ......... 717/168; 717/112; 717/142; 717/171
(58) Field of Classification Search .......... 717/112, 717/143, 168–173
See application file for complete search history.

(56) References Cited

U.S. PATENT DOCUMENTS

| | | | |
|---|---|---|---|
| 7,010,663 B2 * | 3/2006 | George et al. | 711/209 |
| 7,177,924 B2 * | 2/2007 | Murray et al. | 709/223 |
| 7,219,339 B1 * | 5/2007 | Goyal et al. | 717/143 |
| 2006/0129980 A1 * | 6/2006 | Schmidt et al. | 717/114 |

* cited by examiner

*Primary Examiner* — Lewis A Bullock, Jr.
*Assistant Examiner* — Tina Huynh
(74) *Attorney, Agent, or Firm* — Muirhead and Saturnelli, LLC

(57) ABSTRACT

Described are techniques for obtaining grammar updates. A grammar service receives a notification regarding a grammar update applied to a target. The grammar update is an update to a command syntax used by said target. The grammar service sends an update request to said target to obtain said grammar update. The target sends to the grammar service an update response including said grammar update. Also described are techniques for processing a command line. One of a plurality of rule sets is selected. The command line is parsed at said client using said selected rule set. If parsing did not result in a syntax error, a command request is sent from said client to said target. In response, the client receives a command response including information regarding a version of syntax rules currently used on said target.

19 Claims, 17 Drawing Sheets

| Version 1.1 exp1 | Version 2.0 exp2 | Version 3.0 exp3 | Version 3.1 exp4 | Version 4.0 exp5 | .. |

```
<Command_line> ::= <Command> <Command_list>

<Command_list> ::= <Command><Command_list> || NULL

<Command> ::= <Command_keyword> <Command_gen_option_list>

<Command_keyword> ::= COMMAND1 <com1_opt_list> || COMMAND2 <com2_opt_list>...

<Command_gen_option_list>::= <Command_gen_option> <Command_gen_option_list> || NULL
<Command_gen_option>:: GEN_OPTION1 || GEN_OPTION2 ...

<com1_opt_list> ::= <com1_opt> || NULL
<com1_opt> ::= OPT1 || OPT2 .....
<com2_opt_list> ::= <com2_opt> || NULL
<com2_opt> ::= OPT4 || OPT5 ..... ||
       . . .
```

CLIENT WITH FLEXIBLE GRAMMAR-BASE SYNTAX

BACKGROUND

1. Technical Field

This application generally relates to command processing, and more particularly to techniques used for command processing with multiple command syntaxes.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

A host system including a host processor may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with management of a data storage system, commands may be issued using client software. The client software may be installed and executed on a host system which communicates with one or more data storage systems to issue commands to the one or more data storage systems. The commands may be entered via the client software using a command line interface (CLI). The commands may be, for example, to perform data configuration operations, obtain information regarding the status or current configuration, and the like. The client software may be used in connection with issuing commands to different data storage systems each having a different command line syntax or a different version of a supported command line syntax. In one model, the client software may be characterized as a thick client which has knowledge about the different syntaxes used on the various data storage systems with which the client may communicate. Implementations using a thick client may have the client software, rather than the data storage system, parse the commands and detect any syntax errors with the commands. The code and logic for parsing the different syntaxes may be hardcoded or encoded in the client software. One drawback with such a thick client is that a new version of the client software may be downloaded and installed with each update to a supported command syntax. In accordance with a second model, the client software may be characterized as a thin client having no knowledge about the different syntaxes. Implementations using a thin client have command line parsing performed on the data storage system rather than the system on which the client resides. Implementations using a thin client initially install a version of the client. The thin client provides an advantage of not having to update the client software with each change to the one or more command syntaxes. However, parsing is performed on the data storage system so that additional data storage system resources are utilized. Furthermore, in the event of a command error, the data storage system detects the command error and communicates this error to the client software resulting in additional data storage system network traffic.

Thus, it may be desirable to utilize a technique which supports multiple command line syntaxes, and/or versions thereof, and efficiently uses resources of the client, data storage system, and/or network.

SUMMARY OF THE INVENTION

In accordance with one aspect of the invention is a computer-implemented method for obtaining grammar updates comprising: receiving, by a grammar service, a notification regarding a grammar update applied to a target, said grammar update being an update to a command syntax used by said target; sending, by the grammar service, an update request to said target to obtain said grammar update; and sending, by said target to said grammar service, an update response including said grammar update. The notification may be sent to said grammar service in accordance with a subscriber notification model and said grammar service subscribes to receive notifications from said target regarding grammar updates applied to said target. The target may be a data storage system. The command syntax may be a command line syntax used in processing commands executed on said data storage system. The update response may include a rule set representing the syntax rules used to parse commands executed on said target. The grammar service may be included on a host with a command line parser which parses a plurality of different command line syntaxes for a plurality of different types of targets, each of said different types of targets using a different command line syntax associated with a different set of syntax rules. The grammar service may subscribe to receive notifications regarding grammar updates applied to a plurality of data storage systems, each of said plurality of data storage systems having a different one of said command line syntaxes. The grammar service may periodically polls each of said plurality of data storage systems inquiring whether a grammar update has been applied to said each data storage system. The update response may include at lease one of a partial rule set and a set of instructions for generating a complete set of syntax rules in accordance with the grammar update.

In accordance with another aspect of the invention is a computer-implemented method for processing a command line comprising: receiving said command line; selecting, by said client, one of a plurality of rule sets, each of said rule sets defining a different set of syntax rules used for parsing a command line; parsing said command line at said client using said selected rule set; if said parsing did not result in a syntax error, sending a command request from said client to said target, said command request including a representation of said command line; and receiving at said client a command response from said target in response to said command request, said command response including information regarding a version of syntax rules currently used on said target. The client may perform processing using said information included in said command response to determine whether a command line syntax change has occurred on said target. In response to determining that a command line syntax change has occurred on said target, the client may issue an update request to said target to obtain information regarding said command line syntax change, said information including at least one of: a rule set, a portion of a rule set, and instructions for generating a rule set. Each of the plurality of rule sets may be uniquely associated with one of a plurality of grammar identifiers and a version, each of said plurality of grammar identifiers being associated with a different set of commands executed on a different type of target, and wherein each of said plurality of rule sets includes identifiers associated with providing help information. The client may be a host which communicates with a plurality of data storage systems, each of said plurality of data storage systems using one of a plurality of different command sets, each of said plurality of different command sets being associated with a different one of said rule sets.

In accordance with another aspect of the invention is a system comprising: one or more hosts, each of said host comprising a computer readable medium including code stored thereon for: parsing a command line using one of a plurality of different rule sets, each of said rule sets defining syntax rules for one of a plurality of different command sets; sending a command request including a representation of said command line to a first of a plurality of data storage systems; receiving a command response from said first data storage system, said command response including information regarding a current rule set used on said first data storage system; and obtaining grammar updates from said first data storage system, said grammar updates being associated with syntax changes to a command set used on said first data storage system and changes to a rule set used to parse commands for said first data storage system; and said plurality of data storage systems, each of said plurality of data storage systems using one of said plurality of different command sets. Each of said plurality of data storage systems may include a computer readable medium comprising code stored thereon for: parsing a command line using one of a plurality of different rules sets, each of said rule sets defining syntax rules for one of a plurality of different command sets; receiving a command request including said command line from said host; sending a command response to said host, said command response including information regarding a current rule set used on said each data storage system. The code for obtaining grammar updates may include code for obtaining said current rule set from said first data storage system. The code for obtaining grammar updates may include code for generating said current rule set using instructions received from said first data storage system in said command response. Each of said hosts may include a file with an entry for each of said plurality of data storage systems, said entry including an address of said each data storage system and a grammar identifier, version information and an expiration date, said grammar identifier and version information identifying one of said plurality of different rule sets used by said host to parse command lines directed to said each data storage system, said expiration date indicating an expiration date for said one rule set indicated by said grammar identifier and said version information. Each of said hosts may include code stored on a computer readable medium for: determining whether to obtain a grammar update by comparing said information regarding a current rule set used on said first data storage system included in said command response to grammar identifier and version information included in said file for said first data storage system.

BRIEF DESCRIPTION OF THE DRAWINGS

Features and advantages of the present invention will become more apparent from the following detailed description of exemplary embodiments thereof taken in conjunction with the accompanying drawings in which:

FIG. 9 is an example of an index file as may be used on a data storage system in connection with the techniques herein;

FIG. 10 is an example representation of a rule set that may be used in an embodiment;

DETAILED DESCRIPTION OF EMBODIMENT(S)

Figure 1:
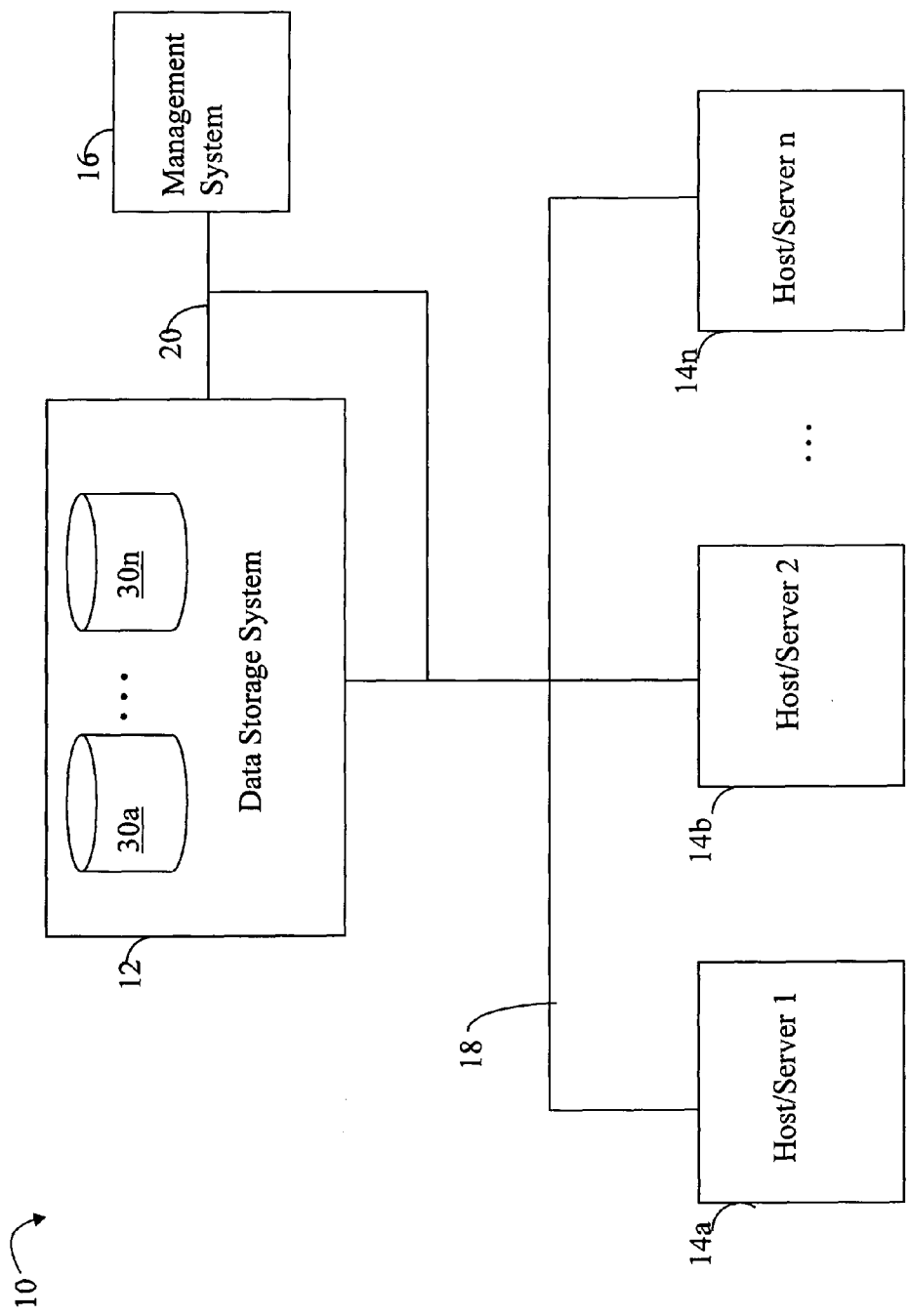
FIG. 1 is an example of an embodiment of a system that may utilize the techniques described herein.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or Fibre Channel connection. Each of the data storage systems 12 may include one or more physical storage devices or drives 30a-30n, such as disks, upon which data is stored. It should be noted that as illustrated in the example 10, the management system 16 and host 14 may communicate directly in accordance with the techniques herein.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment. As noted above, a host may directly communicate with the management system.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices 30a-30n upon which data is stored. The appliance may include software used in connection with storing the data of the hosts on the appliance and also software used in connection with configuring the data storage for use by the hosts in connection with techniques described herein.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein in following paragraphs.

Servers or host systems, such as 14a-14n, provide data and access control information through channels to the storage systems, and the storage systems may also provide data to the host systems also through the channels. The host systems may not address the disk drives 30a-30n of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In connection with management of a data storage system, commands may be issued using client software. The client software may be installed and executed on a host system, such as each of hosts 14a-14n, which communicates with one or more data storage systems to issue commands to the one or more data storage system. The commands may be entered via the client software using a command line interface (CLI). The client software may be used in connection with issuing commands to different data storage systems. Each of the data storage systems may have a different command line syntax or a different version of a supported command line syntax. For example, a first data storage system may be EMC Corporation's CLARiiON® data storage system. A second data storage system may be EMC Corporation's Symmetrix® data storage system. Each of the foregoing first and second data storage systems may have different command sets and associated syntaxes. As a further variation, a third data storage system may also be a CLARiiON® data storage system or a Celerra® data storage system (also by EMC Corporation) but support a command line syntax which is a different version than that of the first data storage system. Client software on the host may be used to communicate with all three of the foregoing data storage systems and issue commands via a CLI.

It should be noted that the different command sets or multiple syntaxes supported may vary with different data storage system vendors as well as type of data storage system for a single vendor. The command sets may vary, for example, if a first data storage system receives block-based commands and a second data storage system receives file-based commands. The foregoing are just some examples of when different command line syntaxes may be used on data storage systems. Client software, such as on a host, may be used to communicate with data storage systems having multiple command line syntaxes for any one of a variety of different reasons.

As known in the art, a CLI may be used, for example, in processing commands of a script or issuing single commands interactively via a command line. In connection with one embodiment described herein, the commands may be used to perform any one of a variety of different tasks in connection with data storage system management and configuration such as, for example, provisioning storage, returning status and configuration information about the data storage system and devices, and the like. It should be noted that although the techniques herein are described with respect to a CLI used for issuing commands between a host having client software thereon and a target which is a data storage system, it will be appreciated by those skilled in the art that the techniques herein have broader applicability. For example, the client software may execute on a different system than a host as described herein and the target may be a system other than a data storage system.

In accordance with techniques herein, command line parsing for multiple, different, command line syntaxes may be performed by client software such as included on the host. Information regarding the different supported syntaxes and associated parsing rules or grammars may be separated from the code (such as a command parser) which performs the command parsing on the host. Client software following this approach allows for information regarding the syntaxes to be updated without requiring modification (e.g., updates or reinstallation) to the command parser. The information regarding the syntaxes may be represented in a form such as a different grammar or different rule set for each supported syntax. Each rule set may set forth different grammar rules used to describe a valid command syntax, such as a set of commands, for use on one type of the data storage system. Each different command set associated with a different type of data storage system may have a different grammar or rule set. Also, each time there is a modification to a command set requiring a change to the grammar for the command set, a new version of a grammar or rule set may exist. The different rule sets may be processed as an input to the command parser. When a new version of a command syntax or a new command set is supported, a corresponding new rule set may be downloaded to the host for use by the command line parser without requiring code of the command line parser to be updated with syntax changes.

The foregoing and other features and advantages of the techniques herein are described in more detail in following paragraphs.

The different messages exchanged between the host having the client software executing thereon and a target data storage system are illustrated in following figures.

Figure 2:
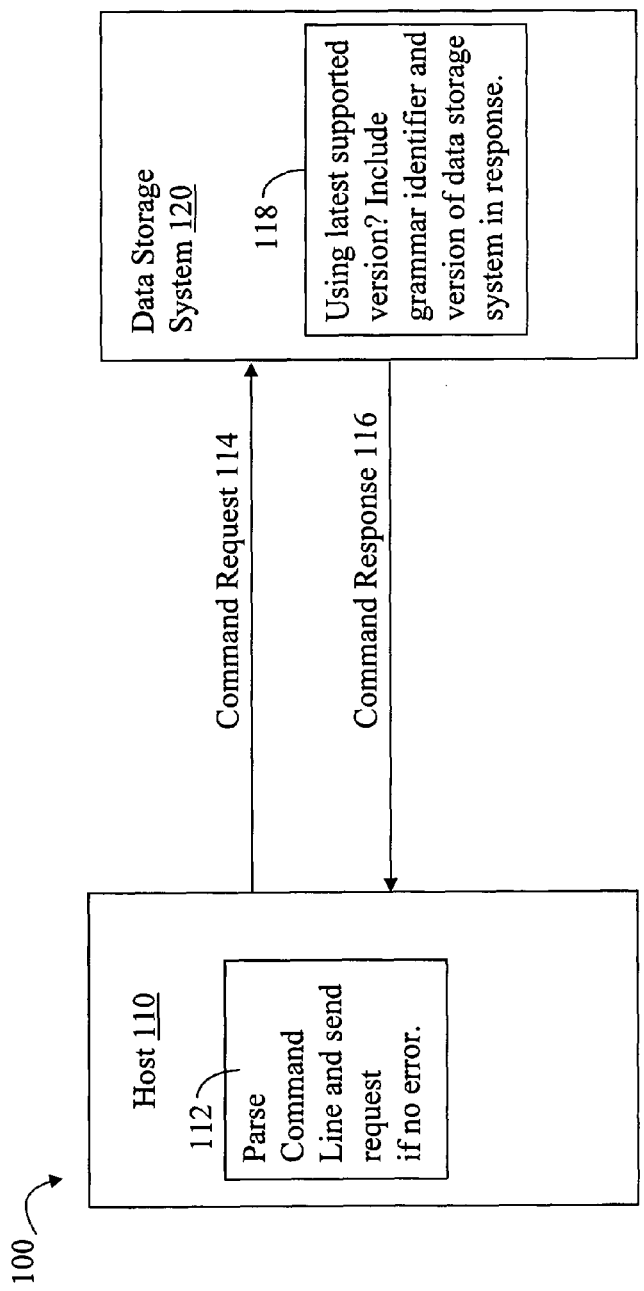
FIG. 2 is an example illustrating command request and response messages that may be exchanged between a host and a data storage system.

Referring to FIG. 2, shown is an example of data flow and messages exchanged between a host and a data storage system in connection with issuing a command to the data storage system via CLI client software executing on the host. It should be noted that although only a single data storage system is included in the example 100 for simplicity in illustration, the host 110 may communicate with multiple data storage systems each having a different command line syntax. The host 110 may receive a command line to be issued to one of the data storage systems, such as data storage system 120. As indicated by 112, the host 110 parses the received command line. If no errors are encountered in parsing the command line, a command request 114 is sent from the host 110 to the target data storage system 120. The data storage system 120 may be specified in the command line as the recipient or target of the command. Each command request 114 may correspond to a command line. The command line may be described as a single line of text that contains all necessary parameters for execution of a single operation on a target data storage system. As described herein, the host 110 may parse the command line in accordance with a set of syntax rules describing the command line format. In other terms, the grammar describing validly formed commands may take the form of a set of syntax rules defining, for example, how keywords, parameters (e.g., commands, options, switches) and the like) comprise a command line. If the command line is recognized as valid in accordance with the syntax rules, no syntax error in parsing occurs on the host and the command request 114 is sent. The command request 114 may be characterized as a message formed from the command line that includes the command line information in one or more data fields of the request.

The data storage system 120 may receive and process the command request. In one embodiment, the command line may be captured as a text string and included in the command request 114. The command line may also be parsed on the data storage system 120. The command request may identify the particular rule set or grammar used by the host to parse the command line. In one embodiment, each rule set representing the syntax rules for a grammar may be denoted by a grammar identifier and a version number. The grammar identifier may indicate the particular command line syntax or command set as used on a data storage system. For each grammar identifier, one or more versions of the command line syntax may be supported. For example, a grammar identifier may be used to identify one command line syntax for a particular vendor's data storage system. There may be multiple versions of the command line syntax supported in accordance with different switches, parameters, and the like, supported at various points in time as the command line syntax evolves with newly added features, changes to existing features, and the like. Each time there is a change to the command line syntax of a grammar, a new version of the grammar may be generated. In one embodiment in which each grammar is represented as a rule set, a new rule set may be used for each version of the grammar.

In connection with parsing the command line on the data storage system, the rule set of the current grammar on the data storage system may be used.

It should be noted that an embodiment may include the received command line in the command request 114 or a representation thereof. For example, the command request 114 may include the command line as a text string. Alternatively, an embodiment may include an intermediate representation (IR) of command line elements such as commands, associated options and settings, and the like. The IR may be in the form of named and/or numeric tokens representing the different command line elements. In an embodiment using an IR, the same IR may be used and understood by the different data storage systems which may each use a different grammar.

The data storage system 120 may perform other processing in connection with executing the command request 114. The data storage system 120 may also make a determination, as indicated by element 118, as to whether the rule set used to parse the command line on the host 110 is associated with the latest supported version of the command line as installed and used on the data storage system. In other words, the data storage system may determine whether the grammar identifier and version as used on the host and included in the command request 114 are the same as the grammar identifier and version associated with the current grammar used for parsing by the data storage system. The data storage system 120 may examine the grammar identifier and version number as included in the command request 114 identifying the rule set used by the host. If a later or different grammar version is currently in use by the data storage system 120, the data storage system 120 may indicate this in the command response 116. In one embodiment, the command response 120 may include the grammar identifier and version number of the rule set currently in use on the data storage system 120. In an embodiment including an IR representation of the command line, the data storage system 120 may perform processing using the IR representation in accordance with the techniques herein.

Figure 3:
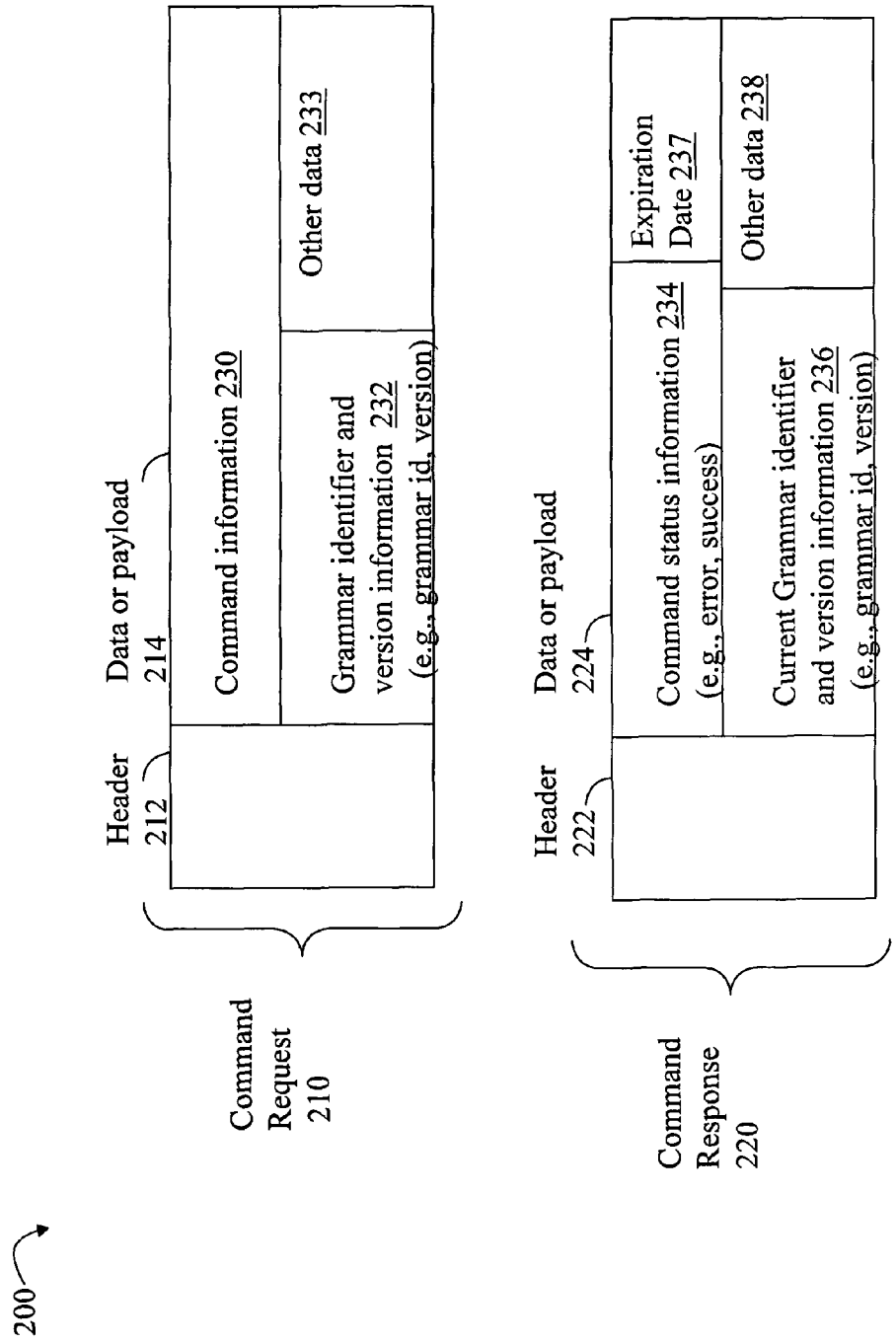
FIG. 3 is an example representation of a command request and command response that may be used in an embodiment with the techniques herein.

Referring to FIG. 3, shown is an example 200 of the command request and command response that may be used in an embodiment. The command request 210 is a logical representation of information that may be included in the command request sent from the host to the data storage system as illustrated in FIG. 2. The command response 220 is a logical representation of information that may be included in the command response sent from the data storage system to the host as illustrated in FIG. 2.

The command request 210 may include a header portion 212 and a data or payload portion 214. The header portion 212 may include information, such as, the addresses of the sender and/or receiver of the request message 210. The data portion 214 may include command information 230 for the command line, a grammar identifier and version information 232, and other data 233. The command information 230 may include the command line as a text string. As described herein, an embodiment may include in 230 a representation of the command line such as an IR representation of the command line. The grammar identifier and version information 232 may include a grammar identifier denoting a particular command line syntax or grammar such as, for example, associated with a particular supported command set on a particular data storage system. The information 232 may also include version information indicating a particular version of the grammar or rule set. For example, in one embodiment, a different grammar identifier may be associated with each different supported command set of each different type of data storage system whose syntax is supported and recognized by the host. For each such grammar identifier, a different version of the rule set expressing the grammar syntax may exist, for example, as new command line options, parameters, or new commands are added. A different version of a grammar may exist for each published change to the associated command line described by the rule set of the grammar. The combination of the grammar identifier and version number may be used to uniquely identify a particular version of a grammar and associate syntax as expressed using a rule set.

The command response 220 may include a header portion 222 and a data or payload portion 224. The header portion 222 may include information similar to that as included in header portion 212. The data portion 224 may include command status information 234 such as an error or success code indicating a status with respect to execution and processing of the command request. The current grammar identifier and version information 236 may include information regarding the grammar identifier and current version used by the data storage system sending the command response 220. The command response 220 may also include an expiration date identifying the date at which the grammar identified by element 236 expires. An expiration date indicated in 237 may be a date stamp (e.g., 2007-12-05) as well as another type of expiration indicator. For example, a special value may be indicated in field 237 if there is no expiration date associated with a grammar. It should also be noted that a command response 220 may include information of fields 236 and 237 for multiple instances or versions of grammars supported by the data storage system. In such case, the data portion 224 may include a list of entries, one for each supported grammar, with each entry including information from fields 236 and 237 (e.g., Celerra, 1.2, 2007-12-05, where "Celerra" and "1.2" correspond to information for field 236 and "2007-12-05" corresponds to information for field 237 for a grammar).

It should be noted that an embodiment may also include information regarding the immediately preceding grammar version. In other words, a request 210 and response 220 may include an instance of 236 and 238 corresponding to the previous grammar version. Such information may be used, for example, to allow a rollback to a previous grammar version during a defined transition time period from when an update is performed if there is a problem with a new or current grammar version.

In addition to what is described above and illustrated in FIG. 3, a command request 210 may also include a client-side request identifier which may be used to uniquely identify the command request. The response associated with this command request may include the same request identifier and may be used by the client in tracking command requests and associated response. The command request may also include a timeout period and a timestamp identifying when the command request was issued or received. The timeout period may be used to specify that the data storage system should not process the command request if an amount of time indicated by the timeout period has lapsed. For example, the timeout period may be an absolute amount of time (e.g., number of milliseconds). The data storage system receiving the command request may examine the current time when a command request is received and, if the current time is greater than (timestamp+timeout), the data storage system may ignore the command request. Of course, the client may also retry resending a command request if no response is received within an expected amount of time and may take appropriate action (e.g., error message, retry sending the command request a number of times, and the like). In an embodiment in which the command request includes a timestamp as well as the command request identifier described above, the command response may also include both. The client may use both the command request identifier and timestamp to track and identify a command request and associated command response.

It should be noted that at times, the data storage system may be in a particular state which may affect the outcome or execution of a command request. For example, the data storage system may be in the process of being upgraded to a new grammar version, maintenance operation, or other operation. In such an instance, the data storage system may not execute the command request and require further confirmation from a user. In this case, the command response may include information regarding the state of the data storage system, indicate a recommendation (e.g., the command request may be more effectively executed after the current operation on the data storage system is completed), and the like. The command response may include a special code indicating the foregoing and resulting in an interactive dialogue with a user on the client. The interactive dialogue may display a warning message or other information regarding the state of the data storage system and any recommendations. The interactive dialogue may present the user with a list of one or more options and request a selection of an option such as to continue with execution of the command, abort execution of the command, execute the requested command after completion of an ongoing operation on the data storage system, and the like. A first additional message may be sent to the data storage system conveying the dialogue selection and a second additional message may be sent to the data storage system indicating confirmation of the first additional message, completion of the requested operation, and the like, in accordance with the dialogue selection.

As will be described in more detail in following paragraphs, the information in the command response, such as the data in 236 indicating the grammar and version currently in use on the data storage system, may be used in subsequent processing to obtain grammar updates in the form of new the rule sets used by the host. Such information may used in synchronizing the grammar versions and associated rule sets of the host and data storage systems.

Figure 4:
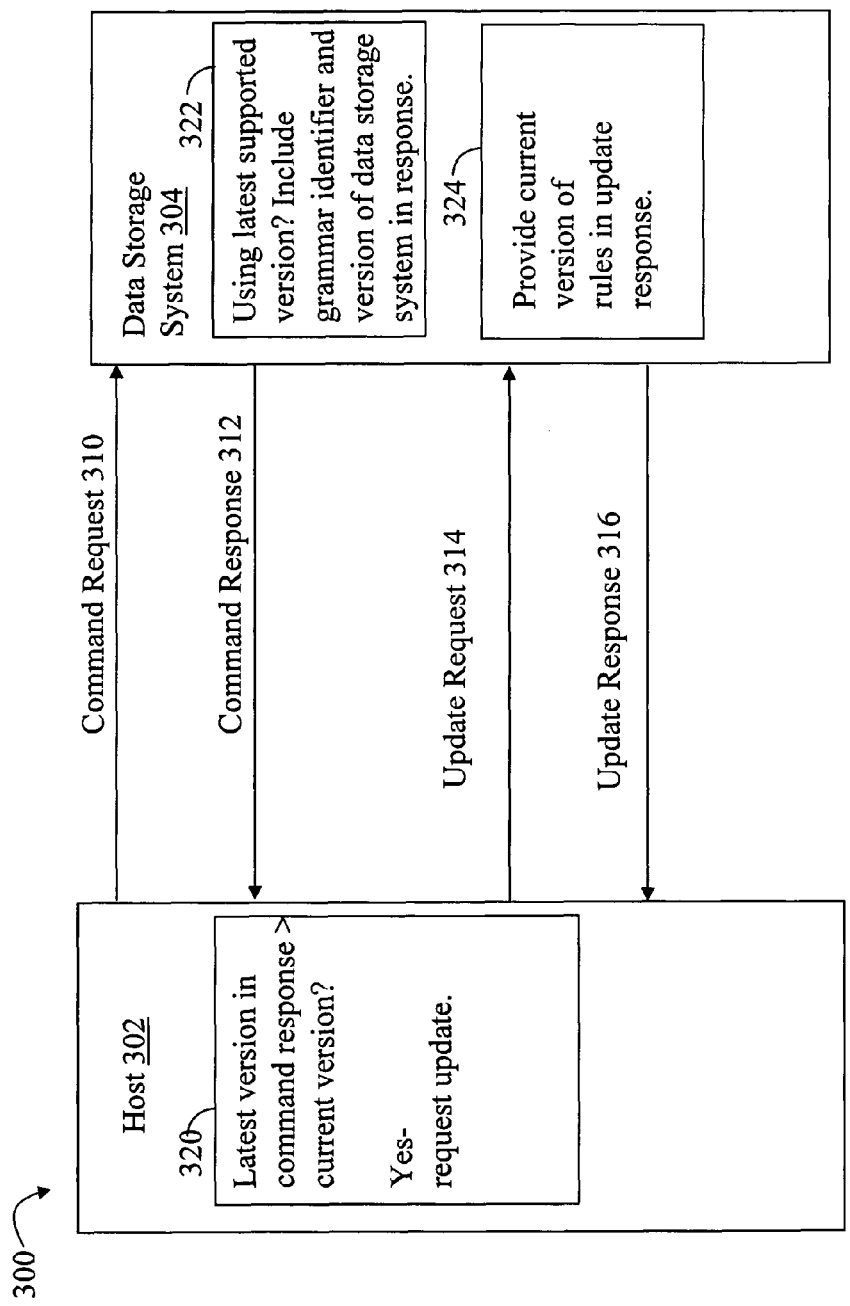
FIG. 4 is an example illustrating update request and update response messages that may be exchanged between a host and data storage system.

Referring to FIG. 4, shown is an example illustrating additional data flow and messages exchanged between the host and data storage system in an embodiment using the techniques herein. The client software on the host 302 may receive the command response 312 including the grammar identifier and version therein indicating the grammar currently in use on the data storage system. As indicated by 320, the client software may use the information regarding the grammar currently in use on the data storage system to determine whether grammar updates on the host-side are needed. In particular, the client software may use this information to make two determinations.

A first determination may be made as to whether the host needs to update a general database or other data area to include a later version of a grammar, or a new grammar, for use in connection with communicating with the data storage system 304, or possibly other data storage systems. If the client software determines that the grammar version in the command response 312 is a later version than that as currently available on the host (e.g., client has at least one other version with grammar identifier that is the same as included in the response 312), or is otherwise a new grammar (e.g., client does not currently have any grammar with the indicated grammar identifier from the response 312), the host may issue an update request 314 to the data storage system 304. The update request 314 may be a request to obtain the syntax rules for the grammar currently in use on the data storage system 304. The data storage system 304 may receive the update request 314 and provide a new version of the grammar in use on the data storage system 304 to the client software on the host 302 in an update response 316. As will be described in more detail herein, the grammar rules may be expressed in as a rule set. In one embodiment, the rule set for the grammar version currently in use on the data storage system 304 may be included in the update response 316.

A second determination that may be made by the host in connection with receiving the command response 312 is directed to whether the host needs to update its information associated with data storage system 304 to indicate that a new or later version of a grammar is in use on the data storage system 304. It may be, for example, that the host already has the new or later version of the grammar indicated in the command response. As such, the host may not need to obtain a new rule set for the later version of the grammar since the host already has such data. However, in connection with the second determination, the client software on the host may need to update information regarding the grammar version currently in use on the data storage system 304. Such information may be used by the host when determining what set of syntax rules to use for parsing a received command line directed to the data storage system.

When the host determines that a grammar update is needed, the host may obtain the grammar update at some point in time after receiving notification of the later grammar version in the command response 312. Prior to obtaining the grammar update, the host may continue using an older grammar version that may also be supported by the data storage system or is otherwise compatible with the current grammar version. As will be described elsewhere herein, the host may receive notification of the grammar update or newer version of the grammar in use on the data storage system 304 using other techniques as well.

It should be noted that a client may issue one of a command request and an update request while the other is not yet complete so that the host 302 has both an outstanding command request 310 and an outstanding update request 314.

It should also be noted that an embodiment may include functionality on the host or other client-side device so that a user may interact and initiate the update request.

Figure 5:
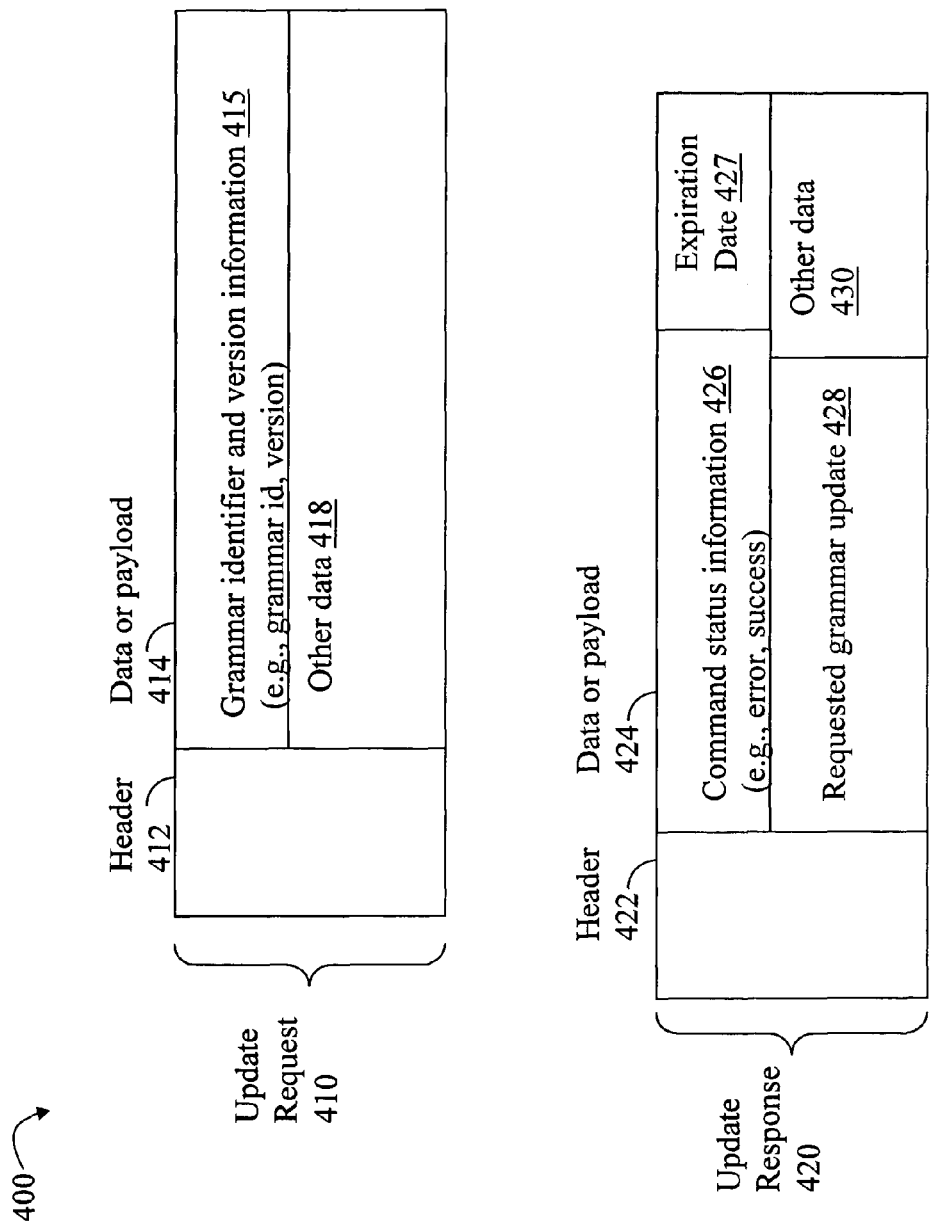
FIG. 5 is an example representation of an update request and update response that may be used in an embodiment with the techniques herein.

Referring to FIG. 5, shown is an example 400 of the update request and update response that may be used in an embodiment. The update request 410 is a logical representation of information that may be included in the command request sent from the host to the data storage system as illustrated in FIG. 4. The update response 420 is a logical representation of information that may be included in the update response sent from the data storage system to the host as illustrated in FIG. 4.

The update request 410 may include a header portion 412 and a data or payload portion 414. The header portion 412 may include information similar to that as described in connection with other message header portions (e.g., such as 212). The data portion 414 may include a grammar identifier and version information 415, and other data 418. The grammar identifier and version information 415 may include an identifier and version number denoting the particular grammar version or update being requested from the data storage system.

The update response 420 may include a header portion 422 and a data or payload portion 424. The header portion 422 may include information similar to that as described in connection with other message header portions. The data portion 424 may include command status information 426, the requested grammar update 428, and other data 430. The command status information 426 may indicate a status associated with the update request. The status may indicate an error or other condition associated with processing the update request 410 on the data storage system. For example, a status of success may be indicated if no errors occurred when retrieving information for the update request and sending the update response. A status of error may be indicated, for example, if the requested grammar identifier and version as indicated in 415 is not available on the data storage system. The requested grammar update 428 may represent the requested grammar update returned as part of the update response 420. In connection with the requested grammar update 428, a complete and new set of rules representing the grammar syntax may be included in the update response. In an embodiment, the grammar update or requested grammar version indicated in 415 of the update request 410 may also be returned to the host in other forms. For example, the grammar update included in the update response 420 may be in the form of a partial rule set including only those rules having changed syntax. The host may then merge the partial rule set of the grammar update with an existing version of the rule set on the client. The client software on the host may include code therein for performing the merging process. As an alternative, a script, program, or other form of commands and instructions may be included in update response 420 with the partial rule set. The script, program, or the like, may be used by the host to instruct the client software how to perform the merging of the partial rule set and an existing rule set. As a result of the merging processing, a new complete set of grammar rules representing the syntax of the grammar update may be generated and stored for use on the host. As another alternative form of the grammar update, the update response may include a set of update instructions in the form of script, program and the like, without including any partial rule set in the update response 420. The update instructions may indicate the modifications or difference of the grammar update with respect to an existing rule set for a previous version of the grammar that may be included on the host. The update instructions may be used, for example, in connection with relatively minor and/or a small number of changes made to a previous version of a grammar. The update instructions may indicate the modifications to be applied to an existing version of a grammar rule set in order to obtain a new rule set representing the updated grammar version. Information included in 426 may indicate a type of grammar update and may be used to determine the expected contents of field 428. For example, field 426 may include an type indicator indicating whether the data of 428 has the update embedded therein, is a script, complete full grammar or partial grammar update, and the like.

An embodiment may also include in the update response 420 an address (e.g., such as a URL or network address) of a resource, such as written documentation, describing the grammar changes, providing assistance on performing the update, and the like.

The update response 420 may also include a field therein indicating the grammar identifier and version of the grammar update included in 428 as part of the update response. The update response may also include an expiration date 427 indicating an expiration date for the new or updated grammar identified by the foregoing grammar identifier and version. It should be noted that the update response 420 may also include a list or other form expressing the one or more grammar versions currently supported by the data storage system. The foregoing one or more grammar versions currently supported by the data storage system may be as described above in connection with FIG. 3 with reference to the command response.

As mentioned above, the host may be notified regarding grammar updates using any one or more different techniques. One such technique is described above in connection with the grammar identifier and version that may be included in each command response message. Another way in which the client software on the host may find out about grammar updates on the data storage system is by software on the host polling the data storage system periodically.

Figure 5A:
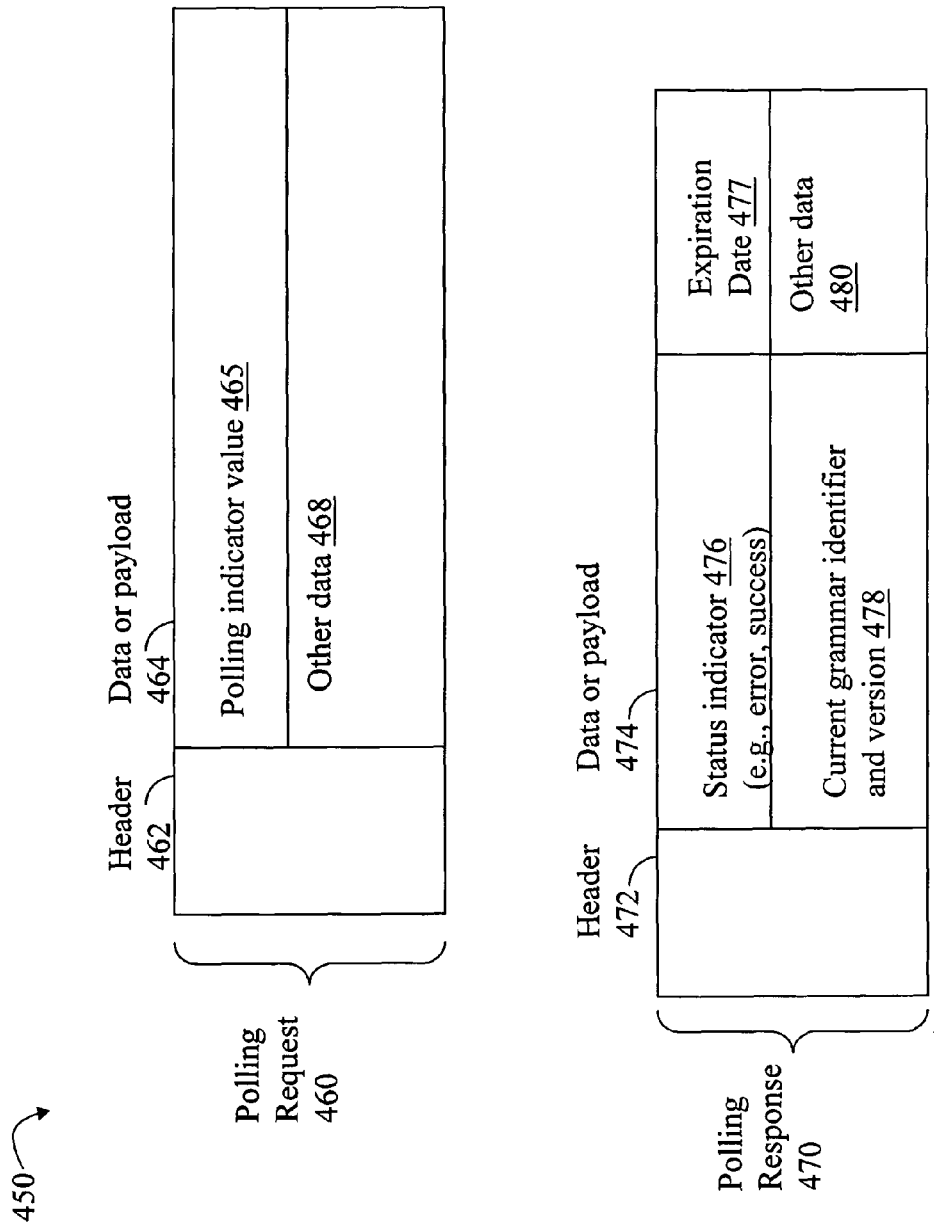
FIG. 5A is an example representation of a polling request and polling response that may be used in an embodiment with the techniques herein.

Referring to FIG. 5A, shown are logical representations of messages that may be exchanged between the host and data storage system in connection with perform the polling operation in an embodiment. The polling request message 460 may include a header portion 462 and a data portion 464. The header portion 462 is as described elsewhere herein in connection with other message header portions. The data portion 464 may include a predefined value or polling indicator 465 and other data 468. The indicator 465 may indicate that the request is inquiring or polling as to the current grammar version in use on the data storage system. In response, the data storage system may issue a polling response message 470 including a header portion 472 and a data portion 474. The header portion 472 is as described elsewhere herein in connection with other message header portions. The data portion 474 may include a status indicator 476 indicating a status (e.g., success, failure, error, and the like) with the polling request 460. The current grammar identifier and version 478 may include the grammar identifier and associated version number identifying the grammar currently in use on the data storage system. The expiration date 477 may indicate the expiration date associated with the grammar identified by field 478. The data portion 474 may also include other data. The client software on the host may compare the information in 478 to other information on the host identifying the current grammar which the host believes is utilized by the data storage system. The other information may be in the form of a grammar identifier and version number associated with the data storage system. Referring back to element 320 of FIG. 4, the client software on the host may compare the other information (e.g., indicating what the host believes is the current grammar version in use on the data storage system) to the information of 478 (e.g., indicating the actual current grammar version in use on the data storage system). If the client software determines that the grammar version of 478 indicates a more recent version than that by the other information stored on the host, the client software may issue an update request message requesting the grammar update or grammar currently in use on the data storage system.

As described above, the polling request 460 may be a general request in which the requester is notified about the grammar current in use on a data storage system. As a first variation, the polling request 460 may request notification about whether a particular grammar and version is in use on the data storage system. In this first variation, the polling request 460 may include a grammar identifier and version in the data portion 464. In the first variation, the polling response may indicate whether the grammar identifier and version from the polling request are currently in use on the data storage system. The request 460 may indicate the grammar which the host believes is the current grammar in use on the data storage system. The data storage system may issue a polling response indicating whether the grammar identified in the polling response is, or is not, the grammar currently in use on the data storage system. A polling response may convey such information, for example, in the status indicator 476 of the polling response. As a second variation, the polling request may inquire as to whether any grammar updates have occurred since a specified date and/or time. The polling response in the second variation may indicate one or more grammar updates which have been applied to the data storage system since the date and/or time included in the polling request. In this case, the polling response may include the grammar identifier and version information of the grammar update applied on the data storage system since the specified date and/or time.

It should also be noted that an embodiment of the polling request 460 which includes a grammar identifier and version as described above may also include an associated expiration date used as an additional piece of information to identify a particular grammar version.

Figure 6:
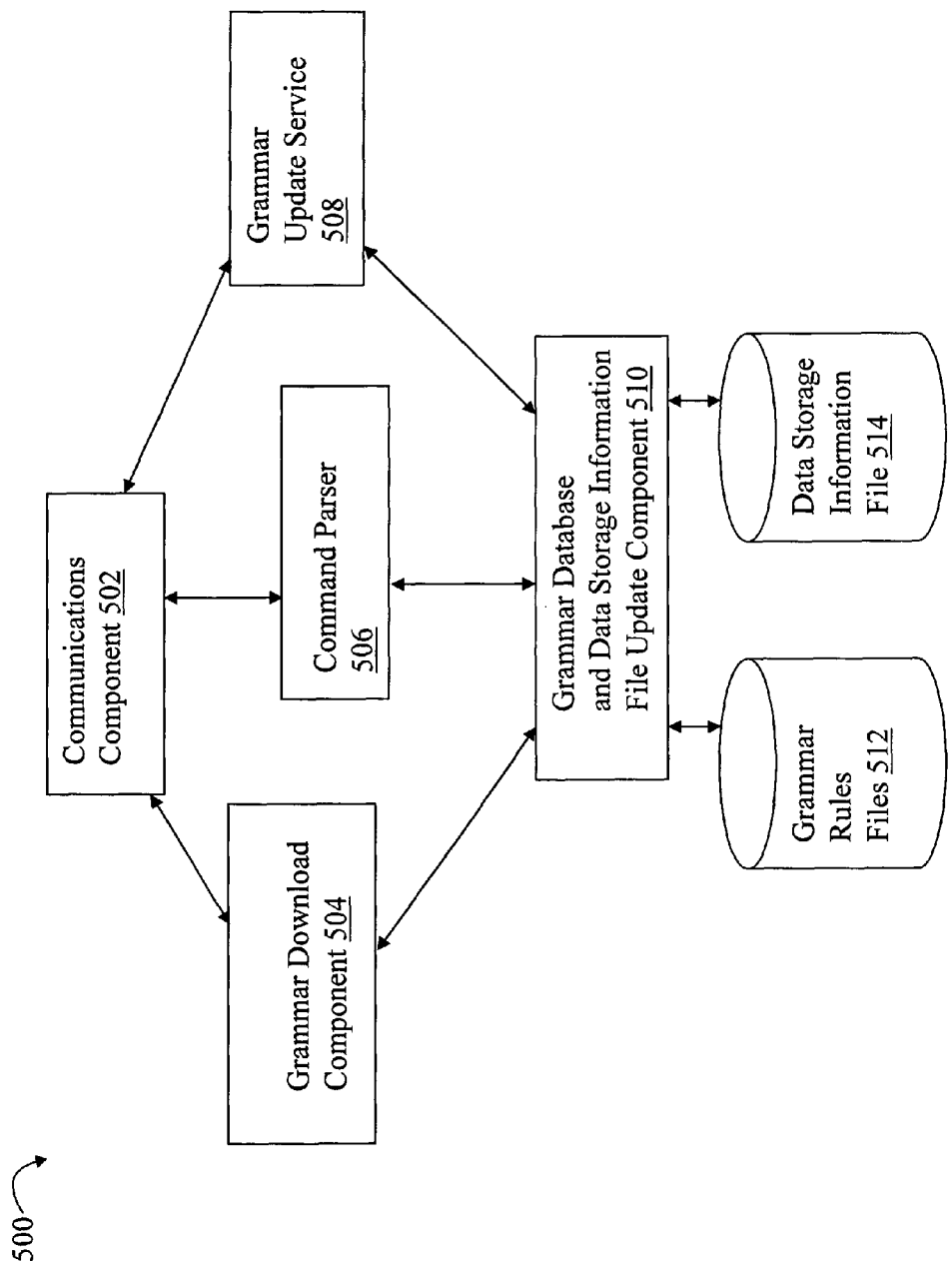
FIG. 6 is an example of components that may be included on the host for use in performing the techniques herein.

Referring to FIG. 6, shown is an example of components that may be included in an embodiment of the host as client software in connection with performing the techniques herein. The communications component 502 may be used in connection with supporting the one or more different communications protocols used in communicating with the data storage system or other target. The grammar download component 504 may be used in connection with downloading any new grammar or rule set, or different versions thereof. The component 504 may issue the update request and receive the update response messages. The component 504 may also perform processing to determine when a grammar update is needed, for example, by comparing a grammar version included in a command response to other information stored on the host indicating a current grammar version for the data storage system. Any grammar updates received by the component 504 are sent to the grammar database and storage information file update component 510 so that the new set of grammar rules may be stored in grammar rules files 512.

The command parser 506 may receive a command line including a command and associated command information directed to a particular target data storage system. The parser 506 may request a grammar rule set from component 510 as used for the target data storage system. In one embodiment, the parser 506 may pass a data storage system identifier to the component 510 identifying the target data storage system for which a rule set is needed. Component 510 may use data storage system identifier as an index into the data storage system information file 514 to obtain grammar identifier and version information associated with the data storage system identifier. The file 514 may include the grammar identifier and version which the host believes identifies the grammar version currently in use on the associated data storage system. The component 510 may obtain the appropriate rule set from 512 in accordance with the data storage system identifier and send the rule set to the parser 506 for use when parsing the command line.

The grammar rules files 512 and data storage information file 514 may be in any one of a variety of different forms. In one embodiment, the grammar rules files 512 may include one or more rule sets in which a different rule set exists for each unique combination of grammar identifier and version. The rules files 512 may be a database, directory of files, or other data container including the rule sets. The file 514 may associate a grammar identifier and version with each data storage system that communicates with the host. The grammar identifier and version may uniquely map or identify a rule set which the host understands to be the current syntax of the associated data storage system. Both the grammar rules files 512 and the data storage information file 514 are described in more detail in following paragraphs.

The grammar update service 508 may operate when the command line processing is offline. The grammar update service 508 may monitor any changes to supported command line syntaxes and accordingly request and apply any updates to the grammar rules file 512 and/or data storage information file 514. The service 508 may perform updating using a polling model as described elsewhere herein using the polling request and response messages. In an embodiment using the polling model, the service 508 may poll, such as on a periodic basis, the one or more different data storage systems to determine whether there have been any grammar updates applied for use on the data storage systems. If so, the service 508 may issue an update request message to the appropriate data storage system to obtain grammar updates via the update response message. It should be noted that the service 508 may issue the update request directly or may communicate with the component 504 to have the component 504 request any such grammar updates (e.g. have the component 504 issue an update request).

An embodiment of the grammar update service 508 may also use a subscriber notification model. In an embodiment using the subscriber notification model, the service 508 may subscribe to receive notification from the one or more data storage systems when there are any updates to the supported command syntaxes thereon. In other words, whenever a grammar update is applied on the data storage systems to which the service 508 subscribes, the service 508 is accordingly notified regarding the occurrence of such updates. In the subscriber notification model, the data storage system sends a notification to the grammar update service 508 regarding any grammar updates on data storage systems of interest (e.g., data storage system to which the service 508 subscribes). In response to receiving such notification, the service 508 may issue an update request to the appropriate data storage system(s).

In the polling model described above, the polling response message may serve as a notification of a grammar update on a data storage system. In order to obtain the grammar update, the host then issues an update request. As a variation to the polling model described above, the polling request message may request notification regarding grammar updates on a data storage system and the polling response message may include the actual grammar update as also included in the update response. For example, if the polling request includes, a grammar identifier and version, a date and/or time value, and the like, the polling response message may include a rule set for the latest grammar update which has been applied to the data storage system since the grammar version or date/time indicated in the polling request.

In an embodiment, the grammar update service 508 may be implemented in any of a variety of different ways. For example, an the service 508 may be implemented as a daemon process in a Unix-based environment or a service in Windows-based environment.

Figure 7:
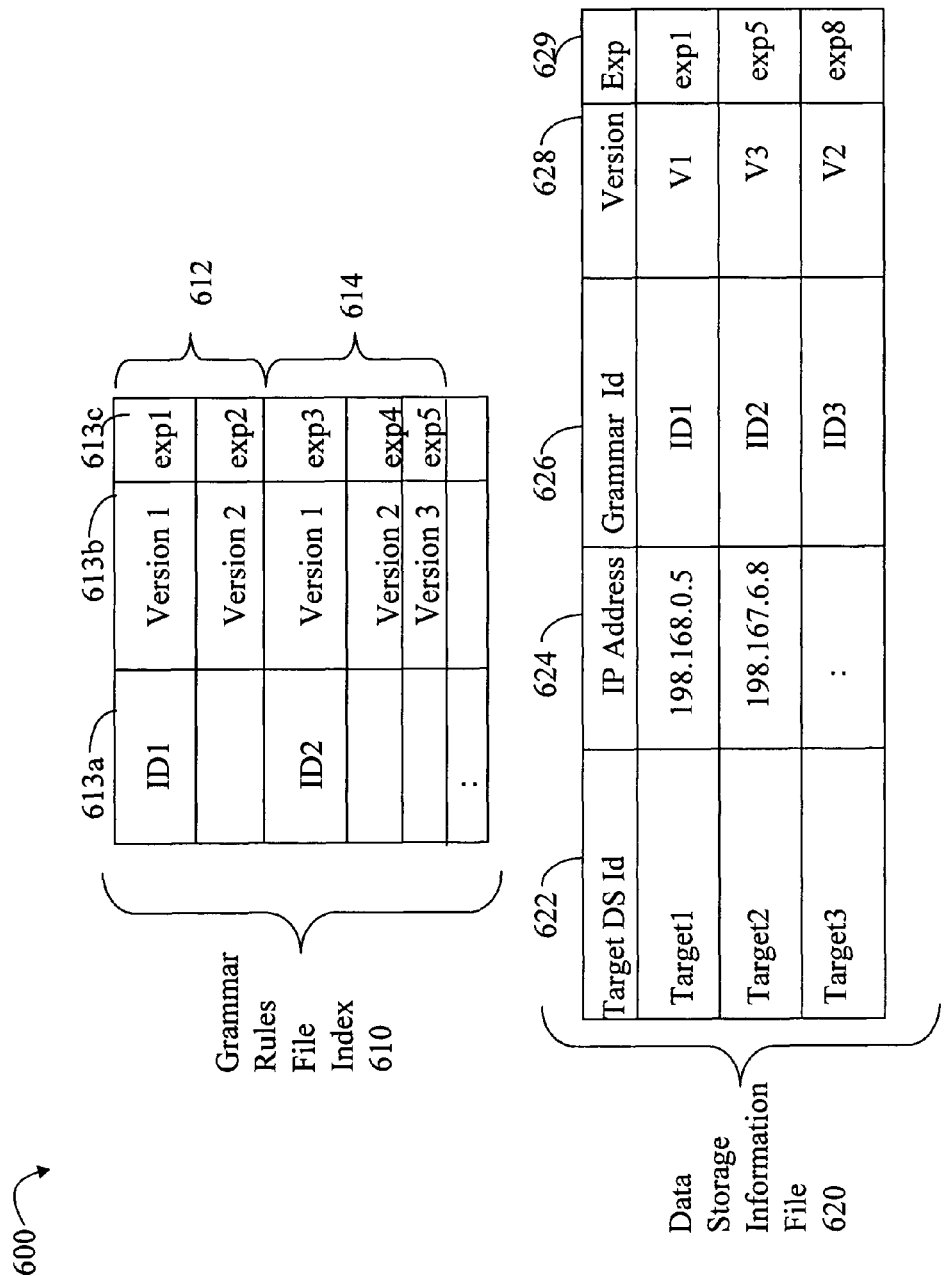
FIG. 7 is an example representation of file formats that may be stored on the host in an embodiment.

Referring to FIG. 7, shown is a representation of a grammar rules file index and data storage information file as may be used by the client software on the host in one embodiment. The grammar rules file index 610 may represent an index of the supported command sets, and each version thereof, as supported by the client software. Each entry in the index 610 may be associated with a different rule set included in the grammar rules files 512. Column 613*a* includes the grammar identifier as may be associated with each command set. Column 613*b* includes a version indicator of the particular command set. As described elsewhere herein, a rule set may be associated with each version of a grammar and the rule set may include the syntax rules used for parsing a command line. Column 613*c* includes an expiration date for the associated grammar. The index 610 may include one or more entries associated with each different supported command line syntax. In the example 600, element 612 represents two entries in the index 610 associated with a first command set used for a first type of first data storage system. The grammar identifier ID1 is associated with different grammar versions for the first command set. There has been one update to the command syntax for the first command set as indicated by the second entry ("Version 2") included in 612. The first entry ("Version 1" of 612) represents the initial grammar version for the first command set. Element 614 represents 3 entries in the index 610 associated with a second command set used for a second type of data storage system. The grammar identifier ID2 is associated with different grammar versions for the second command set. There have been two updates to the command syntax for the second command set as indicated by the second entry ("Version 2") and third entry ("Version 3") included in 614. The first entry ("Version 1" of 614) represents the initial grammar version for the second command set. Each time there is a grammar update due to a syntax change for an existing command set, a new rule set is added to the grammar rules files 512 and a corresponding entry is made in the index 610. If a new command set and associated syntax is supported, a new grammar identifier (e.g. IDx) may be associated with new command set. In this case, a new entry appears in the index 610 which includes the new grammar identifier and an initial or first version indicator (e.g., "Version 1"). An example representation of a rules file is described in following paragraphs.

The data storage information file 620 may represent information maintained by the host regarding the current grammar versions on the different target data storage systems for which the client software processes command lines. The file 620 may include an entry for each target data storage system identifying the current grammar version for the target data storage system. In this example, each entry of 620 includes target data storage system name or identifier 622, an address, such as an IP address 624, a grammar identifier 626, and a version 628. The address 624 in this example is an IP address for the data storage system indicated in 622 of the same entry. The address 624 may be retrieved and used in connection with sending a command request or other communications to a data storage system. For a given entry in the file 620, the information in columns 626 and 628 may be used to uniquely identify one of the grammar rule sets included in the index 610. The rule set identified by 626 and 628 is used by the command parser when parsing command lines directed to the data storage system of 622. As described above with reference to the components of FIG. 6, when the command parser 506 receives a command line directed to a particular data storage system, the command parser 506 may request from the component 510 the rule set file for the particular data storage system. The component 510 determines the appropriate entry in the data storage information file 620 as indexed by target data storage system identifier 622 and retrieves the grammar id 626 and version 628 of the entry. The combination of 626 and 628 correspond to a rule set. In turn, the component 510 may use the combination of 626 and 628 as an index value into the file 610 to obtain the rule set used to parse commands for the particular data storage system. The component 510 may return the rule to the command parser. An embodiment may also include in the file 620 an expiration date 629 for each grammar. The expiration date may be used as a third piece of information to identify and distinguish between different grammars.

Figure 8:
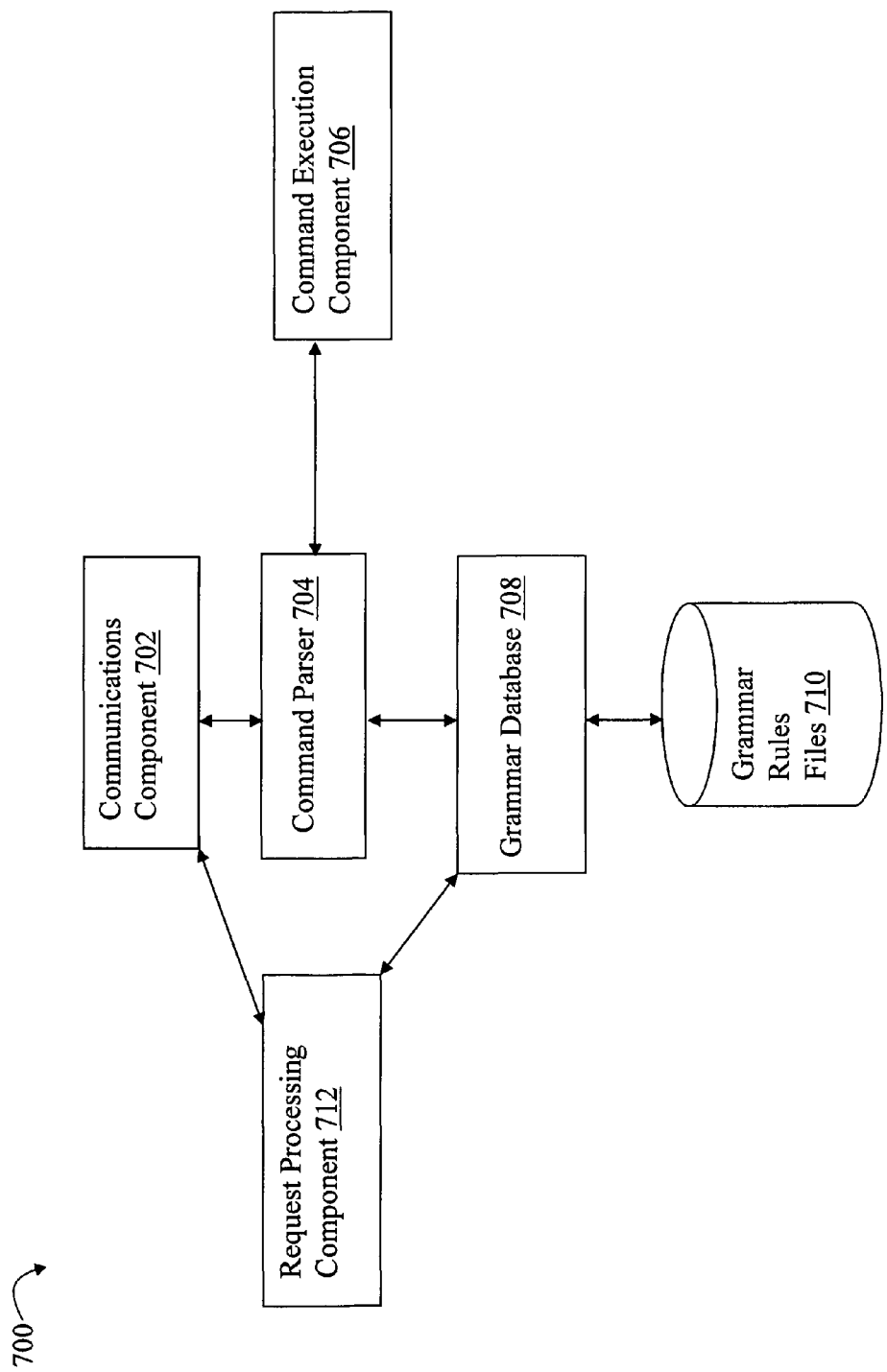
FIG. 8 is an example of components that may be included on the data storage system for use in performing the techniques herein.

Referring to FIG. 8, shown is an example representation of components that may included on a data storage system for use in connection with the techniques herein. In this example 700, the data storage system may include a communications component 702, a command parser 704, a command execution component 706, and a grammar database 708 for managing the one or more grammar rules files 710. The communications component 702 is similar to the communications component 502 as described in connection with FIG. 6. The command parser 704 is similar to the parser 506 as described in connection with FIG. 6. The grammar database 708 may be a software application used in connection with managing the one or more grammar rules files 710. Each of the grammar rules files 710 are similar to the rules files 512 of FIG. 6. The command execution component 706 may execute the parsed command on the data storage system. The request processing component 712 may handle processing of different requests other than command requests received by the data storage system. For example, the component 712 may process update requests received from the host and send out an appropriate update response message incorporating the rule set from 710 for the requested grammar version.

In one embodiment, the data storage system may store one or more rule sets for each of different versions of the grammar syntax rules for the command set. Each rule set may correspond to a different version of the command line syntax as published at a point in time. The rules sets of the grammar rules files 710 are the same rule sets as may be included in the grammar rules files 512 of FIG. 6 on the host. When the data storage system receives a command request from the host, the command request includes grammar identifier and version information identifying a particular version of the grammar and associated rule set of 710. The data storage system may retrieve the rule set as indicated by the grammar identifier and version information of the request and use the rule set for parsing the command line also included in the command request. In the command response, the data storage system may include information identifying the most current version of the grammar available on the data storage system.

Referring to FIG. 9, shown is an example of an index file as may be maintained on the data storage system. In this example 800, the index file may include a list of grammar versions and associated expiration dates. Each entry in the index file may map to a different rule set in grammar rules files 710 of FIG. 8. In this example, only a single command set is supported on the data storage system so no grammar identifier is illustrated. However, in an embodiment in which the data storage system may execute multiple different command sets each having its own grammar identifier, the index file 800 may be as described and illustrated in connection with 610 of FIG. 7 on the host.

Referring to FIG. 10, shown is an example representing a rule set as may be associated with a particular grammar version identified by a combination of the grammar identifier and version information. A rule set corresponding to one version of a grammar may be a text file including syntax rules in any one of a variety of different formats. In the example 900, the rules of the grammar may be represented using BNF (Bachus Naur Form). The syntax rules may be encoded, for example, using XML or some other format. The example 900 includes grammar rules in which grammar nonterminals are enclosed in "<>" and other symbols may represent terminals. The rules define valid syntax for the command lines. The "|" separates different alternative definitions or expansions of the left-hand side rule nonterminal that may be used in defining validly formed command lines. A command line is valid if it can be derived from, or produced using, the syntax rules of the rule set.

The example 900 illustrates one form or representation of a rule set as may be included on the data storage system and host. As known in the art, a parser may be represented by a state transition diagram indicating the possible valid states and transitions therebetween. The grammar rule set or other form in which a valid command line syntax version or grammar update may be represented may express the parser states and valid state transitions associated therewith.

Figure 10A:
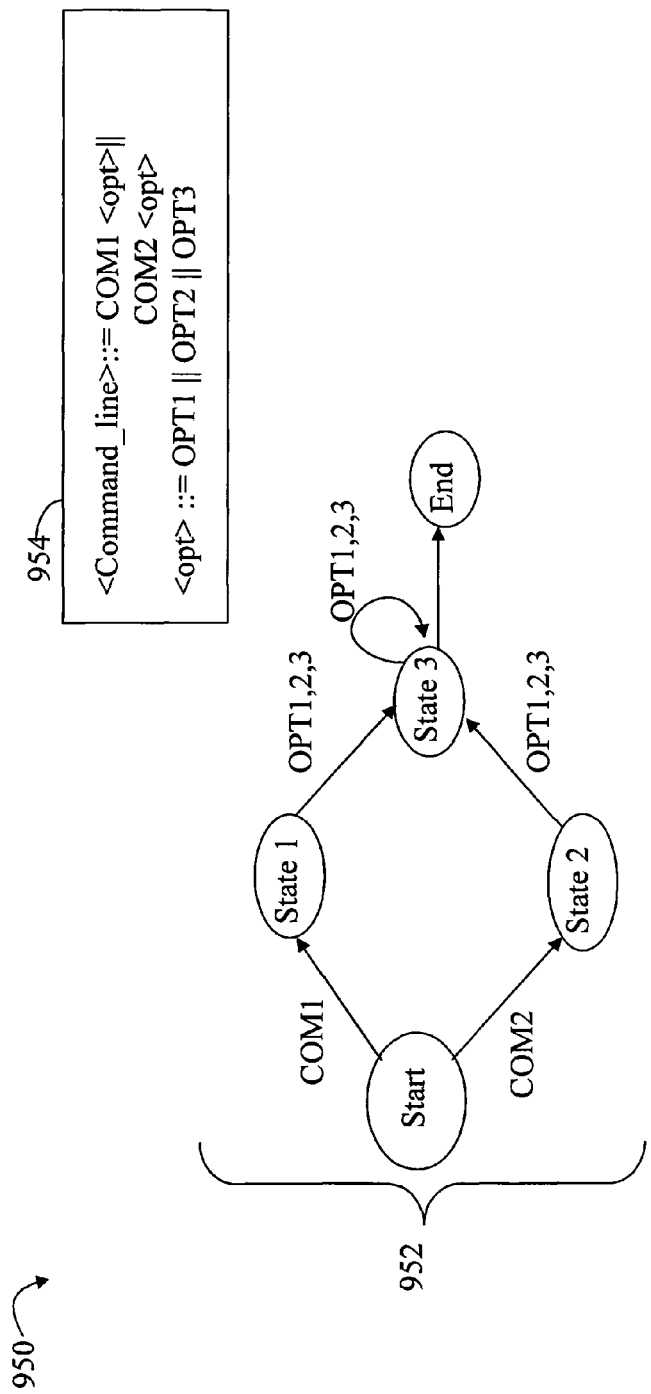
FIG. 10A is an example of rule set and associated state transition diagram that may be used in an embodiment.

Referring to FIG. 10A, shown is an example illustrating a state transition diagram 952 and corresponding grammar rules 954. As will be appreciated by those skilled in the art, the example 950 is a simple example illustrating a command line syntax which includes 2 commands each having a same set of options. The grammar rules 954 and state diagram 952 indicate that at least one command option must be specified. For notation purposes, the first command is "COM1" in 954 and the second command is "COM2" in 954. The rules file may be implemented, for example, as an XML file expressing the rules as illustrated in 954 and based on the state transitions of 952.

An embodiment may also embed in the rule set help information for each different command and option. The help information may be displayed to a user when requested. The help information may be included in the rule set as illustrated in 900 in a variety of different ways. For example, the rule set may identify a location (e.g., file name, location in file), at which help information for the particular command and/or option may be found. It should be noted that this information may be stored locally or at another network location. The help file and its contents may vary with user location, international settings (e.g., country or language indicator), and the like. The help information for a particular command and/or option may be indicated in the grammar rules file by a corresponding command and/or option token in the rules file. As such, the client may parse help commands locally and also retrieve corresponding help information if available.

Figure 11:
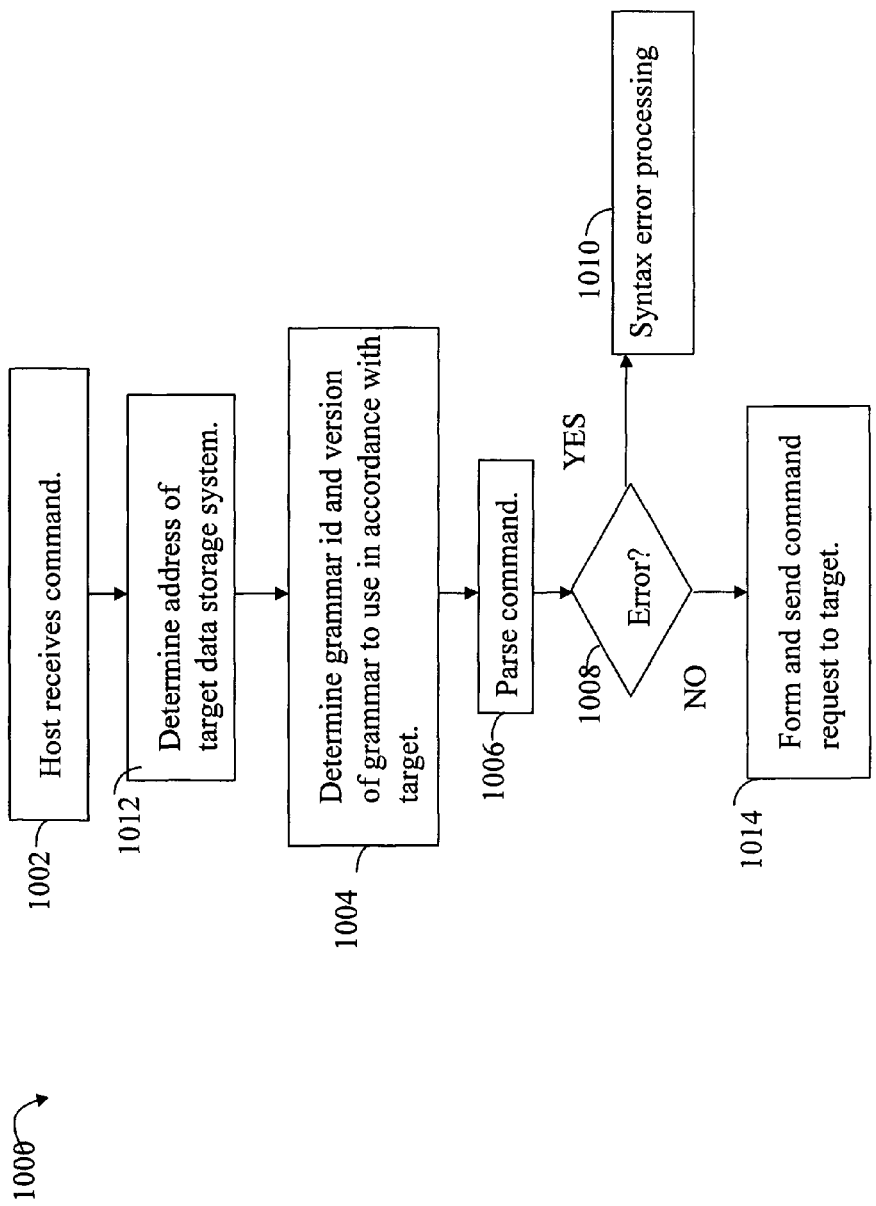
FIGS. 11-13 are flowcharts of processing steps that may be performed in an embodiment in connection with the techniques herein.

Referring to FIG. 11, shown is a flowchart of processing steps as may be performed in accordance with the techniques herein. The steps of the flowchart 1000 summarize processing as described above that may be performed by code executing on the host when processing a command line. The steps of the flowchart 1000 may be performed, for example, by the components included in FIG. 6. At step 1002, the host receives a command line directed to a target data storage system. At step 1012, the address of the target data storage system is determined. The address may be, for example, an IP address obtained from the data storage information file as described elsewhere herein. At step 1004, the host determines the grammar version for the target data storage system and retrieves the rule set for the grammar version. At step 1006, the command parser uses the retrieves rule set to parse the command line received in step 1002. At step 1008, it is determined whether a parsing error occurred when parsing the command line. If so, control proceeds to step 1010 to perform error processing. Otherwise, if step 1008 evaluates to no, control proceeds to step 1014. At step 1014, the command request including the command line received in step 1002 is formed and sent to the target data storage system.

Figure 12:
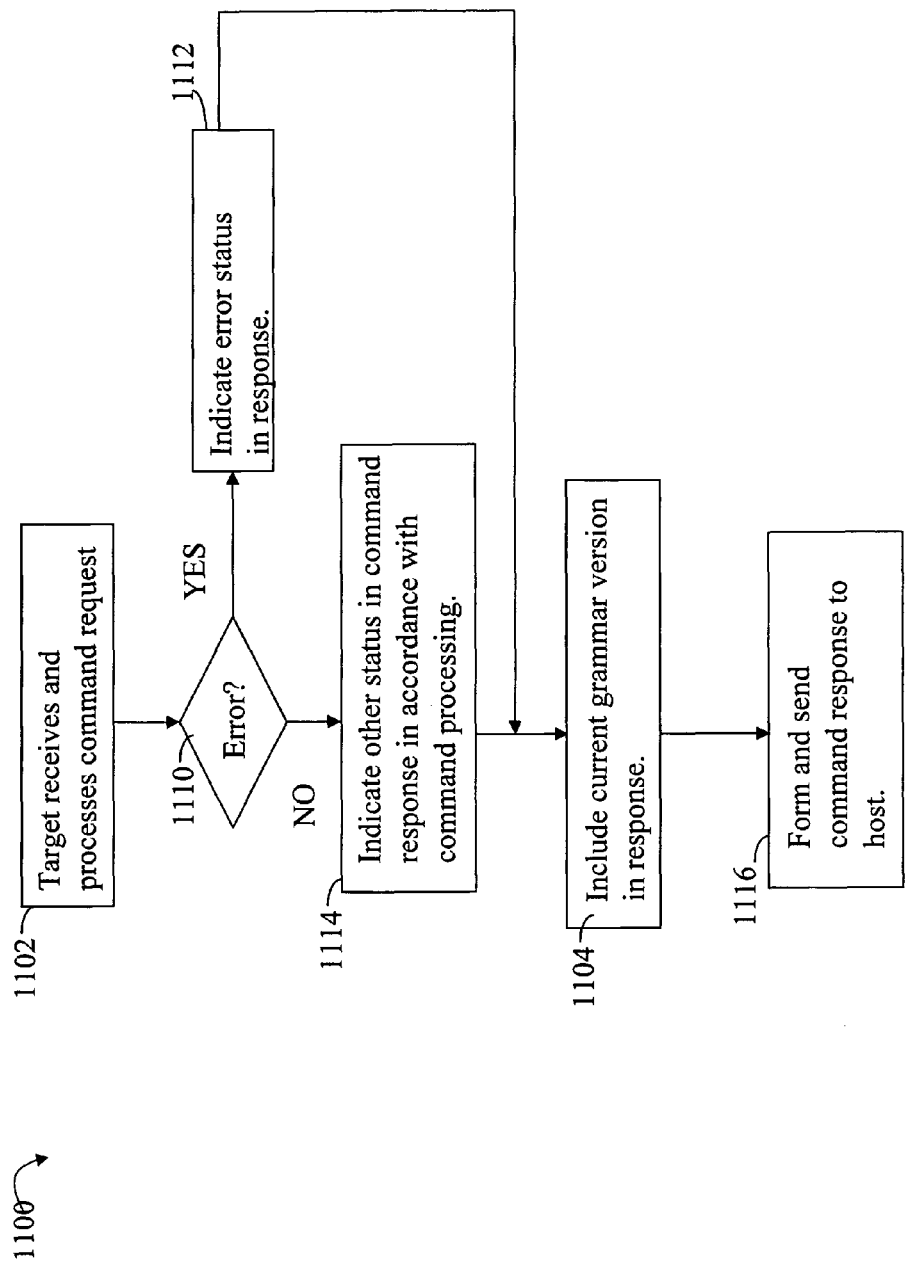

Referring to FIG. 12, shown is a flowchart of processing steps as may be performed in accordance with the techniques herein. The steps of the flowchart 1100 summarize processing as described above that may be performed by code executing on the data storage system when processing a received command request. The steps of the flowchart 1100 may be performed, for example, by the components included in FIG. 8. At step 1102, the target data storage system receives and processes the command request. Step 1102 may include processing such as parsing the command line included in the command request and also executing the command on the data storage system. At step 1110, a determination is made as to whether any errors occurred in connection with processing the command request in step 1102. If so, control proceeds to step 1112 so indicate an error status in the command response. Control then proceeds to step 1104. If step 1110 evaluates to no, control proceeds to step 1114 to indicate other appropriate status information in the command response in accordance with the command processing of step 1102. At step 1104, the data storage system may obtain information identifying, the current or latest version of the grammar (e.g. grammar identifier and version information) on the data storage system. Such information may be included in the command response formed and sent in a later step. At step 1116, the command response is formed and sent to the host.

Figure 13:
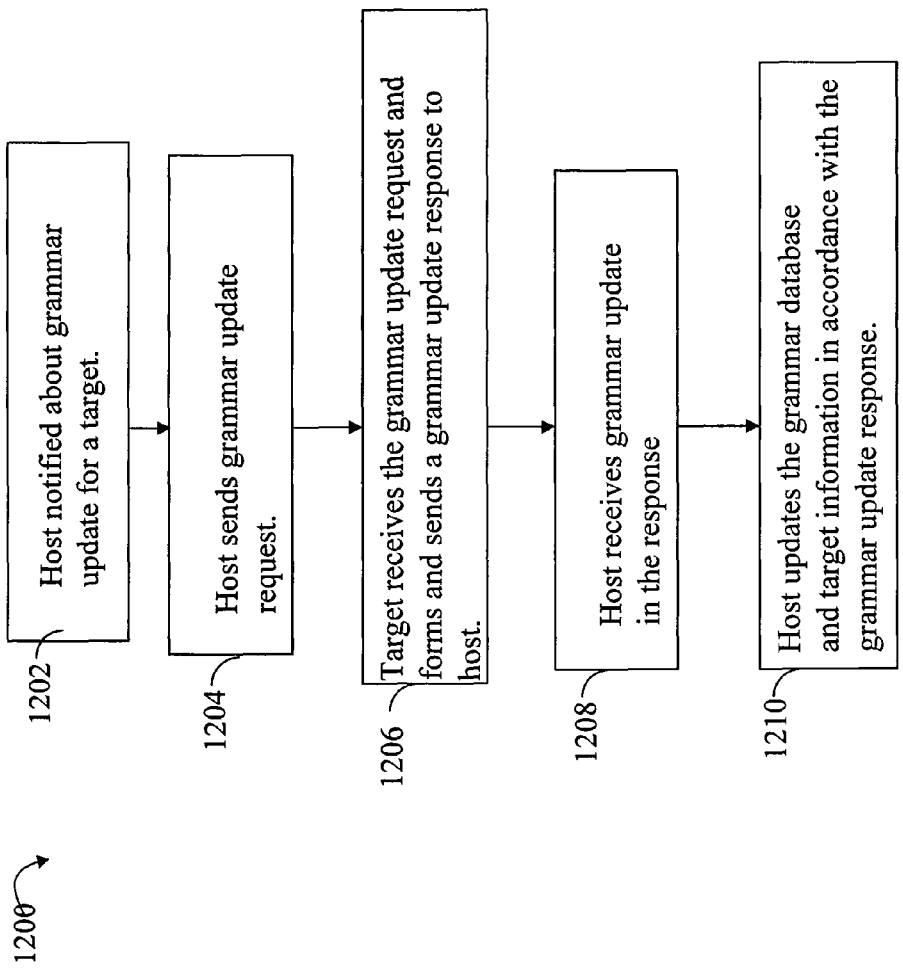

It should be noted that the steps of FIGS. 11, 12 and 13 do not explicitly mention use of an expiration date for a grammar version or other variations as may be described herein. However, such variations and associated processing steps are also possible as will be appreciated by those skilled in the art.

Referring to FIG. 13, shown is a flowchart of processing steps that may be performed in an embodiment in connection with grammar updates. The steps of the flowchart 1200 may be performed by the client software on the host. At step 1202, the host is notified about a grammar update applied to a target data storage system. As described herein, there are a variety of different ways in which such notification may completed. The host may be notified in connection with a command response, through polling, and/or a subscription notification. At step 1204, the host may send a grammar update request to the target data storage system. In step 1206, the target data storage system receives the grammar update request, and forms and sends a grammar update response to the host. The update response may include the rule set or other information indicating how to produce the rule set for the new grammar or version thereof. At step 1208, the host receives and processes the update response. Step 1208 may include extracting the rule set from the update response or otherwise performing processing the generate the new rule set. At step 1210, the host updates the set of grammar rules files and/or data storage information file as needed. As described herein, step 1210 processing may include storing the new rule set in a database or other data container including the host-side rule sets. Step 1210 may also include updating the data storage information file to indicate that a new grammar version is in use on the target data storage system.

Figure 14:
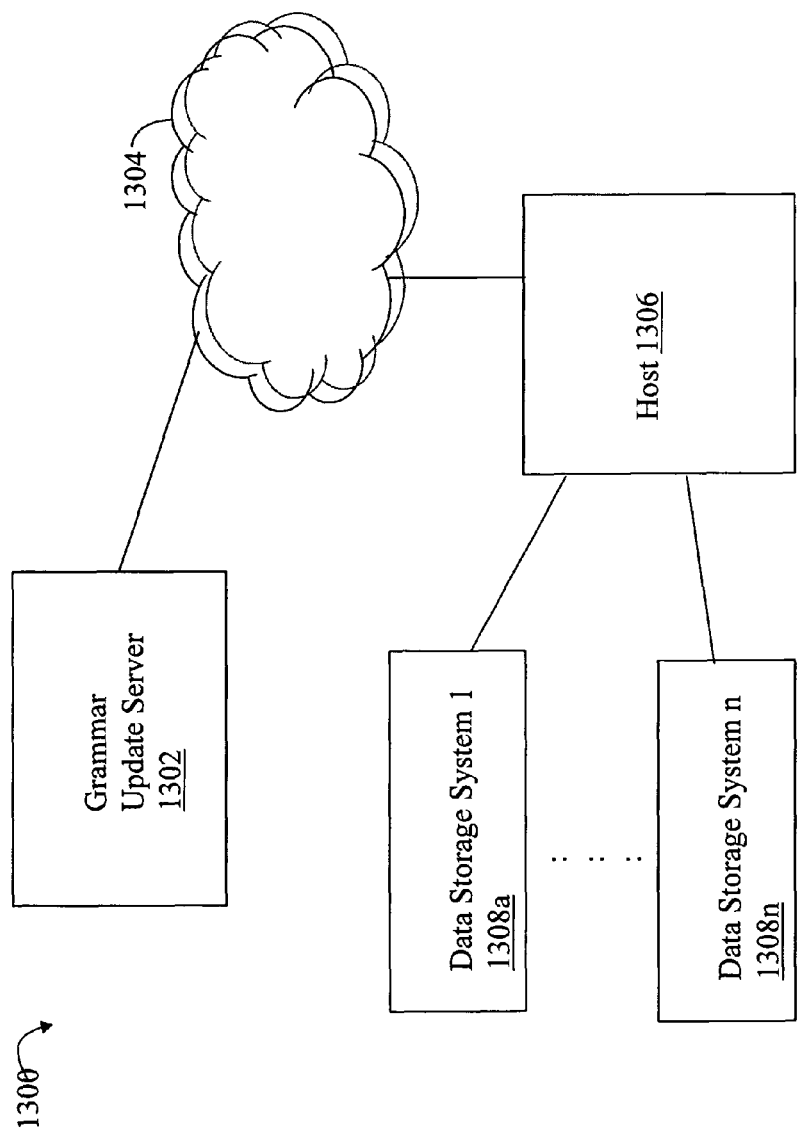
FIG. 14 is an example of an embodiment of a system that may utilize the techniques herein.

Referring to FIG. 14, shown is an example representing an arrangement in which the techniques herein may be performed. The example 1300 includes a host 1306 and data storage systems 1308a-1308n. The host 1306 may be connected via network 1304, such as the Internet, to a grammar update server 1302. In the example 1300, the host 1306 may communicate with the server 1302 and/or the data storage system 1308a-1308n to obtain grammar updates. As described above in connection with other example illustrations, the host 1306 may issue update requests to the data storage systems 1308a-1308n to obtain grammar updates. The host 1306 may also receive notification from the data storage systems 1308a-1308n regarding grammar updates using a variety of different techniques has described herein. In addition to the foregoing, or as an alternative to the foregoing, the host 1306 may also be notified regarding grammar updates from the server 1302. The 1306 may also request grammar updates from the server 1302. In one embodiment, the host 1306 may be notified regarding grammar updates on the data storage systems by the data storage systems 1308*a*-1308*n*. In turn, the host 1306 may request the updates from the server 1302 and/or the data storage systems 1308*a*-1308*n*. The command response or other notification received by the host 1306 indicating the grammar update may also include one or more addresses of where the host 1306 may obtain the grammar update. One of the addresses may be that of the server 1302. As an example, the host 1306 may receive a command response from data storage system 1308*a* indicating a grammar update has been applied to 1308*a* and the host 1306 needs to obtain the rule set for the grammar update. The command response may include an IP address of the server 1302 as the location of where the host 1306 should obtain the grammar update by issuing an update request. Although the example 1300 shows only a single server 1302, there may be multiple servers and each server may handle providing selected grammar updates. The command response may include the IP address of the appropriate server to contact to obtain the grammar update.

In connection with the techniques herein, the host may obtain the first version of a grammar rule set using a variety of different techniques. In one embodiment, a set of one or more rule sets may be shipped and installed with the command parser and other host-side software. Additional rule sets may be obtained as needed in accordance with techniques described herein. In another embodiment, the initial rule set for a grammar may be obtained as part of processing a first command line request for a data storage system. In yet another embodiment, as part of host startup processing, the host may discover one or more data storage systems to which the host has connectivity (e.g., as part of discovery processing) and populate the data storage information file 620. Subsequently, the host may issue update requests to each data storage system to obtain the rule set corresponding to the grammar in use on the data storage system.

Described herein are techniques that may be used with a client, such as the host, which processes multiple command line syntaxes, and versions thereof, associated with different targets, such as data storage systems. The techniques described herein may be used in connection with obtaining grammar updates, and notification of such updates, by the client. Because the command line syntaxes have been encapsulated in different rule sets maintained external from the command parser, the grammar rules sets may be updated as command line syntax changes occur without requiring updates to the command parser. The client may be notified regarding grammar updates via a grammar service using a polling or subscriber notification model. In one embodiment, the grammar service may operate while there is no active command line processing. The client may also be notified regarding grammar updates on the different targets via a command response. The grammar updates can be in any of a variety of different forms including complete rule sets as well as partial rule sets and/or command scripts or instructions for generating a complete rule set corresponding to a grammar version. The grammar updates may be obtained from the data storage systems or other locations. The techniques herein provide for the client parsing a command line prior to communicating with the target. As such, the client is able to detect any syntax errors without utilizing the resources of the target systems. Parsing on the client-side provides for more efficient use of network resources and may result in the reduction of messages exchanged between the client and target in the event of a syntax error.

As described herein, an embodiment may utilize expiration dates and associate an expiration date with each grammar version and corresponding rule set. In such an embodiment, there may be a transition period during which two grammar versions may be valid in accordance with their respective associated expiration dates. A first grammar version may not yet have expired and, upon the occurrence of such expiration, a newer second grammar version may then be in effect. In such an embodiment, a warning message or indicator may be returned, for example, by the data storage system in a command response in response to a command request from a host identifying the first grammar version. As another example illustrating how an embodiment may use the foregoing expiration dates, a host or other client-side device having both grammar versions available thereon may also allow a user to express commands in either of the two grammar versions and may provide information to the user regarding both grammar versions during the transition period. Such information may include help information on syntax changes.

In one embodiment, a grammar and associated rule set may be partitioned into multiple files wherein each of the files relates to a particular data storage device command, option, or other feature. Associated with a grammar version may be a master rule file which includes or incorporates each of the different multiple files. When a change or grammar modification is made for a particular command, option or feature, the grammar update may be performed by replacing the one or more included files for the modified command syntax.

Figure 15:
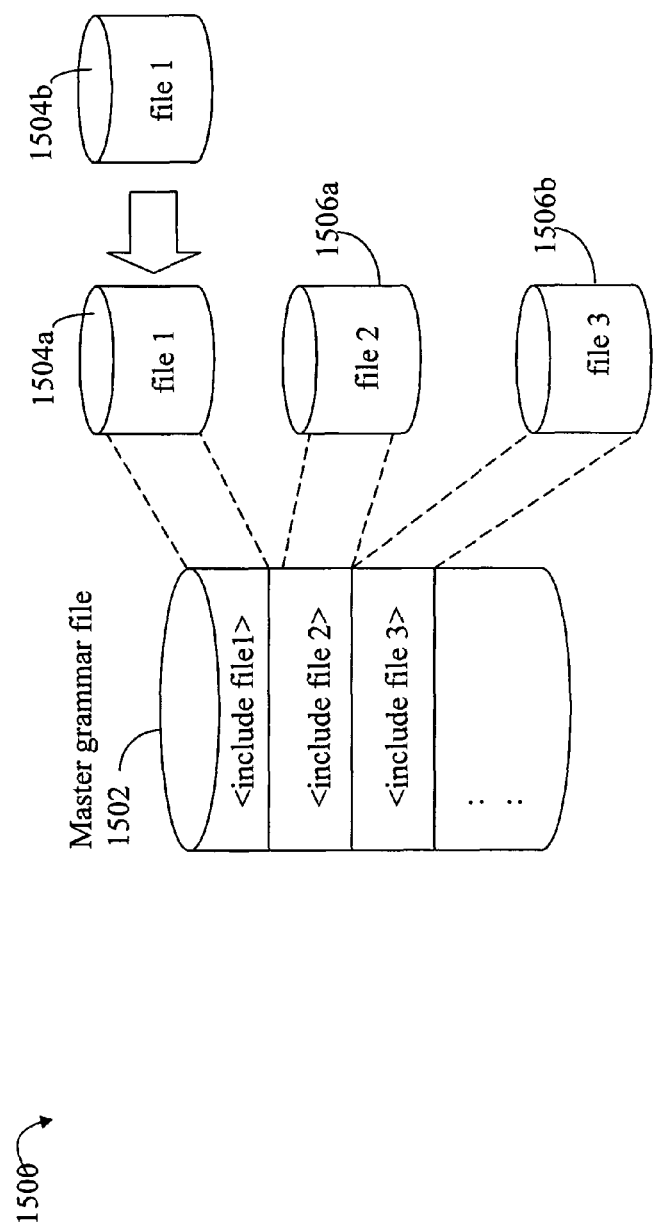
FIG. 15 is an example representation of files that may be associated with a grammar version in an embodiment using the techniques described herein.

Referring to FIG. 15, shown is an example illustrating how an embodiment may represent a grammar version. The example 1550 includes a master grammar file 1502 which may include commands which result in retrieval or incorporation of the contents of files 1504*a*, 1506*a*, and 1506*b*. Collectively, the files 1504*a*, 1506*a* and 1506*b* may represent the grammar rules for a particular grammar version. A command line syntax change may be made with respect to the feature having the syntax indicated by file1 1504*a*. The foregoing syntax change may be made in a grammar update including the new grammar rules in file 1504*b*. As such, the techniques herein may be used to provide file 1504*b* and replace file 1504*a* with 1504*b*. Files 1502, 1504*a*, 1506*a* and 1506*b* may be stored, for example, on the host or other client-side device for each grammar version. An embodiment may reuse a single file, such as 1506*a* or 1506*b*, with multiple grammar versions by storing a single copy of the file which is referenced in multiple master grammar files, each of the multiple master grammar files being associated with a different grammar version. The master grammar file associated with a grammar version may reference the appropriate version of "file 1" (e.g., 1504*a* or 1504*b*).

As described herein, an embodiment may include in a command request a representation of the command line such as an IR representation of the command line rather than the actual command line, such as a text string. In such an instance in which the IR is included, the grammar rules may utilize the IR rather than the command line elements.

An embodiment may implement the techniques herein using code executed by a computer processor. For example, an embodiment may implement the techniques herein using code which is executed by a processor of the data storage system and host. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by the processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method for obtaining grammar updates comprising:
  receiving, by a grammar service, a notification regarding a grammar update applied to a target, said grammar update being an update to a command syntax used by said target;
  sending, by the grammar service, an update request to said target to obtain said grammar update; and
  sending, by said target to said grammar service, an update response including said grammar update, wherein said grammar service is included in a host that performs first processing of a command line, the first processing comprising:
    selecting, by the host, one of a plurality of rule sets, each of said rule sets defining a different set of syntax rules used for parsing a command line including one or more command line interface commands;
    parsing said command line at said host using said selected rule set;
    if said parsing did not result in a syntax error, sending a command request from said host to a data storage system, said command request including a timestamp indicating when the command request was issued, a timeout period and a representation of said command line, and wherein the method further comprises performing second processing of the command request at the data storage system, the second processing including:
      determining whether a current time exceeds a time value represented by a sum of the timestamp and the timeout period;
      if the current time exceeds the time value, ignoring the command request and otherwise performing other processing, said other processing including:
        parsing, at the data storage system, the one or more command line interface commands of the command line included in the command request; and
        sending a command response to the host in response to the command request, said command response including information regarding a version of syntax rules currently used on the data storage system, wherein the host uses the information to determine whether to update the plurality of rule sets used by the host.

2. The method of claim 1, wherein said notification is sent to said grammar service in accordance with a subscriber notification model and said grammar service subscribes to receive notifications from said target regarding grammar updates applied to said target.

3. The method of claim 1, wherein said target is said data storage system.

4. The method of claim 3, wherein said command syntax is a command line syntax used in processing commands executed on said data storage system.

5. The method of claim 1, wherein said update response includes a rule set representing the syntax rules used to parse commands executed on said target.

6. The method of claim 1, wherein said grammar service is included on said host with a command line parser which parses a plurality of different command line syntaxes for a plurality of different types of targets, each of said different types of targets using a different command line syntax associated with a different set of syntax rules.

7. The method of claim 6, wherein said grammar service subscribes to receive notifications regarding grammar updates applied to a plurality of data storage systems, each of said plurality of data storage systems having a different one of said command line syntaxes.

8. The method of claim 7, wherein said grammar service periodically polls each of said plurality of data storage systems inquiring whether a grammar update has been applied to said each data storage system.

9. The method of claim 1, wherein said update response includes at least one of a partial rule set and a set of instructions for generating a complete set of syntax rules in accordance with the grammar update.

10. A computer-implemented method for processing a command line comprising:
  receiving said command line at a client, said command line including one or more command line interface commands;
  selecting, by said client, one of a plurality of rule sets, each of said rule sets defining a different set of syntax rules used for parsing a command line;
  parsing said command line at said client using said selected rule set;
  if said parsing did not result in a syntax error, sending a command request from said client to said target, said command request including a timestamp indicating when the command request was issued, a timeout period, and a representation of said command line;
  processing the command request at the target, the processing including:
    determining whether a current time exceeds a time value represented by a sum of the timestamp and the timeout period;
    if the current time exceeds the time value, ignoring the command request and otherwise performing other processing, said other processing including:
      parsing, at the target, the one or more command line interface commands of the command line included in the command request; and
      sending a command response to the client in response to the command request, said command response including information regarding a version of syntax rules currently used on said target, wherein the client uses the information to determine whether to update the plurality of rule sets used by the client.

11. The method of claim 10, wherein said client performs processing using said information included in said command response to determine whether a command line syntax change has occurred on said target.

12. The method of claim 11, wherein, in response to determining that a command line syntax change has occurred on said target, said client issues an update request to said target to obtain information regarding said command line syntax change, said information including at least one of a rule set, a portion of a rule set, and instructions for generating a rule set.

13. The method of claim 10, wherein each of said plurality of rule sets is uniquely associated with one of a plurality of grammar identifiers and a version, each of said plurality of grammar identifiers being associated with a different set of commands executed on a different type of target, and wherein each of said plurality of rule sets includes identifiers associated with providing help information.

14. The method of claim 10, wherein said client is a host which communicates with a plurality of data storage systems, each of said plurality of data storage systems using one of a plurality of different command sets, each of said plurality of different command sets being associated with a different one of said rule sets.

15. A system comprising:
one or more hosts, each of said hosts comprising a computer readable medium including code stored thereon for:
parsing a command line at said each host using one of a plurality of different rule sets, each of said rule sets defining syntax rules for one of a plurality of different command sets, said command line including one or more command line interface commands;
sending a command request including a timestamp indicating when the command request was issued, a timeout period, and a representation of said command line from said each host to a first of a plurality of data storage systems;
receiving a command response from said first data storage system, said command response including information regarding a current rule set used on said first data storage system, wherein said each host uses the information regarding the current rule set of the first data storage system to determine whether to update the plurality of different rule sets used by said each host; and
obtaining grammar updates from said first data storage system, said grammar updates being associated with syntax changes to a command set used on said first data storage system and changes to a rule set used to parse commands for said first data storage system; and
said plurality of data storage systems, each of said plurality of data storage systems using one of said plurality of different command sets; and wherein the system further comprises said plurality of data storage systems, wherein said first of said plurality of data storage systems includes a computer readable medium comprising code stored thereon for:
processing the command request at said first data storage system, the processing including:
determining whether a current time exceeds a time value represented by a sum of the timestamp and the timeout period;
if the current time exceeds the time value, ignoring the command request and otherwise performing other processing, said other processing including:
parsing at said first data storage system the one or more command line interface commands of the command line included in the command request; and
sending the command response to said each host in response to the command request.

16. The system of claim 15, wherein said code for obtaining grammar updates includes code for obtaining said current rule set from said first data storage system.

17. The system of claim 15, wherein said code for obtaining grammar updates includes code for generating said current rule set using instructions received from said first data storage system in said command response.

18. The system of claim 15, wherein each of said hosts includes a file with an entry for each of said plurality of data storage systems, said entry including an address of said each data storage system and a grammar identifier, version information and an expiration date, said grammar identifier and version information identifying one of said plurality of different rule sets used by said host to parse command lines directed to said each data storage system, said expiration date indicating an expiration date for said one rule set indicated by said grammar identifier and said version information.

19. The system of claim 18, wherein each of said hosts includes code stored on a computer readable medium for:
determining whether to obtain a grammar update by comparing said information regarding a current rule set used on said first data storage system included in said command response to grammar identifier and version information included in said file for said first data storage system.

* * * * *